(12) United States Patent  
Wang et al.

(10) Patent No.: US 8,705,915 B2
(45) Date of Patent: Apr. 22, 2014

(54) LIGHT TURNING FEATURE PATTERNS FOR LIGHTGUIDES

(75) Inventors: Lai Wang, Milpitas, CA (US); Marek Mienko, San Jose, CA (US); Ion Bita, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 236 days.

(21) Appl. No.: 13/298,065

(22) Filed: Nov. 16, 2011

(65) Prior Publication Data

US 2012/0236390 A1 Sep. 20, 2012

Related U.S. Application Data

(60) Provisional application No. 61/453,084, filed on Mar. 15, 2011.

(51) Int. Cl.
G02B 6/26 (2006.01)
F21V 7/04 (2006.01)
(52) U.S. Cl.
USPC ............................. 385/31; 362/606; 362/619
(58) Field of Classification Search
USPC .................................................. 362/606, 619
See application file for complete search history.

(56) References Cited

U.S. PATENT DOCUMENTS

| 7,758,227 | B1 | 7/2010 | Coleman |
| 7,876,489 | B2 | 1/2011 | Gandhi et al. |
| 2002/0080597 | A1 | 6/2002 | Coghlan |
| 2006/0077690 | A1 | 4/2006 | Inditsky |
| 2008/0094853 | A1* | 4/2008 | Kim et al. ..................... 362/612 |
| 2010/0156953 | A1 | 6/2010 | Nevitt et al. |
| 2010/0165660 | A1 | 7/2010 | Weber et al. |
| 2010/0302616 | A1* | 12/2010 | Bita et al. ..................... 359/291 |

FOREIGN PATENT DOCUMENTS

| WO | 2008045312 A1 | 4/2008 |
| WO | 2010143176 A1 | 12/2010 |

OTHER PUBLICATIONS

Idé; T. et al.; "Dot Pattern Generation Technique Using Molecular Dynamics," Journal of the Optical Society of America, vol. 20, No. 2, Feb. 2003, pp. 248-255.
International Search Report and Written Opinion—PCT/US2012/028326—ISA/EPO—Jun. 12, 2012.
International Preliminary Report on Patentability—PCT/US2012/028326—The International Bureau of WIPO Geneva, Switzerland, May 31, 2013.

* cited by examiner

*Primary Examiner* — Omar Rojas
(74) *Attorney, Agent, or Firm* — Knobbe, Martens, Olson & Bear, LLP

(57) ABSTRACT

This disclosure provides systems, methods and apparatus for providing illumination by using a light guide to distribute light and for determining spacing between light turning features in the light guide. In one aspect, a light intensity profile along a first axis is determined and the pitch of light turning features along that first axis is varied based upon this profile, while the pitch along a second crossing axis (for example, an orthogonal axis) and the sizes of the light turning features remain unchanged. In some implementations, an apparatus includes a light guide having an array of light turning features configured to turn light from at least one light emitter. The light turning features can be non-uniformly spaced apart along a first axis such that pitches vary non-monotonically and, along a second axis that crosses the first axis, the light turning features are spaced apart with substantially the same progression.

43 Claims, 18 Drawing Sheets

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

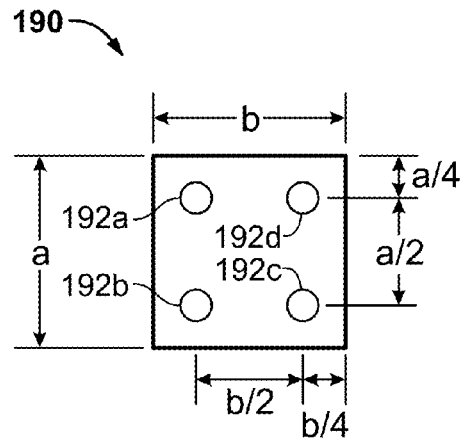
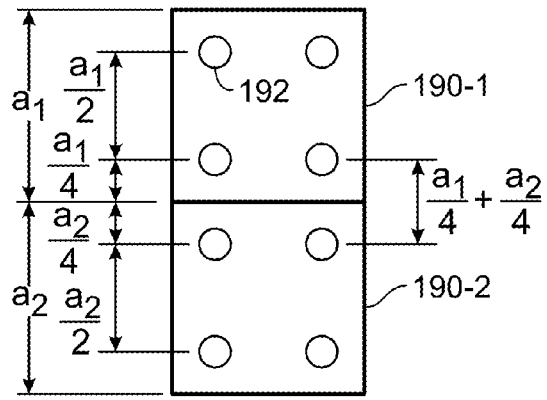
Figure 11A
Figure 11B
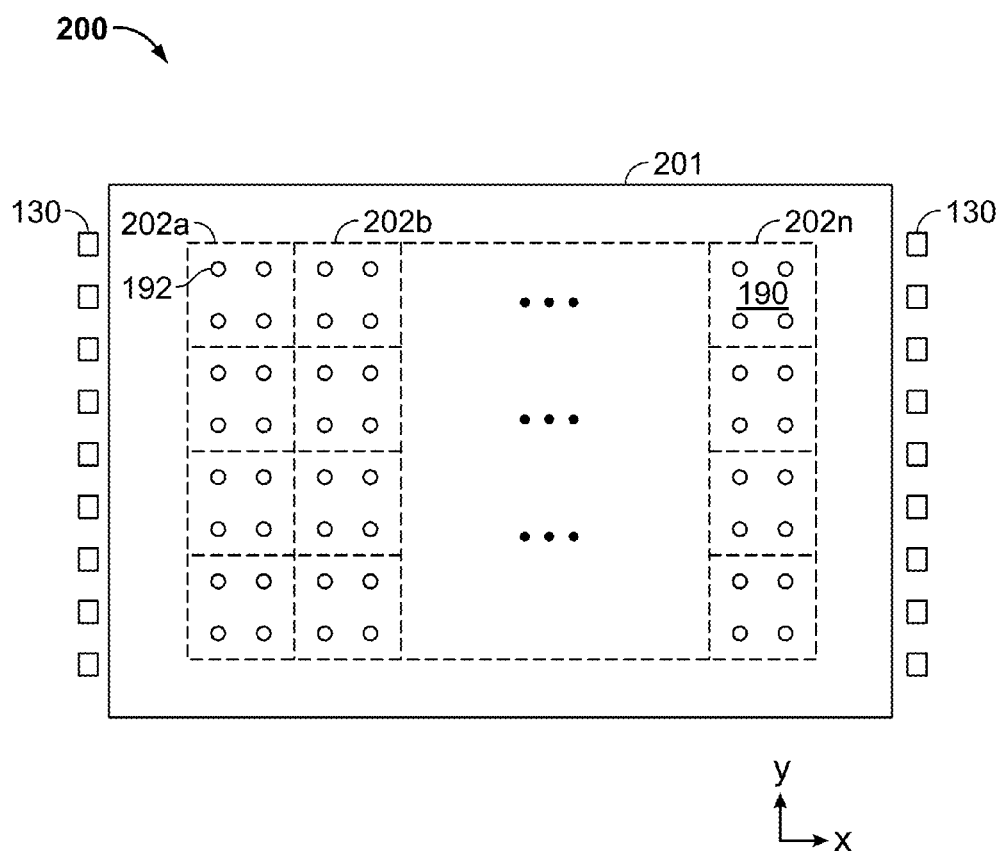
Figure 11C

LIGHT TURNING FEATURE PATTERNS FOR LIGHTGUIDES

CROSS-REFERENCE TO RELATED APPLICATIONS

This disclosure claims the benefit under 35 U.S.C. §119(e) of U.S. Provisional Patent Application No. 61/453,084, filed 15 Mar. 2011, entitled "LIGHT TURNING FEATURE PATTERNS FOR LIGHTGUIDES," and assigned to the assignee hereof. The disclosure of the prior application is considered part of, and is incorporated by reference in its entirety, this disclosure.

TECHNICAL FIELD

This disclosure relates to illumination systems, including illumination systems for displays, particularly illumination systems having light guides with light turning features, and to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Reflected ambient light is used to form images in some display devices, such as reflective displays using pixels formed by interferometric modulators. The perceived brightness of these displays depends upon the amount of light that is reflected towards a viewer. In low ambient light conditions, light from an illumination device with an artificial light source is used to illuminate the reflective pixels, which then reflect the light towards a viewer to generate an image. To meet market demands and design criteria for display devices, including reflective and transmissive displays, new illumination devices are continually being developed.

SUMMARY

The systems, methods and devices of the disclosure each have several innovative aspects, no single one of which is solely responsible for the desirable attributes disclosed herein.

One innovative aspect of this disclosure can be implemented in an illumination apparatus that includes one or more light emitters and a light guide. The light guide includes an array of light turning features. Each light turning feature of the array is configured to turn light from at least one of the one or more light emitters. The light turning features are non-uniformly spaced apart along a first axis such that distances separating adjacent light turning features vary non-monotonically along the first axis. The light turning features occupy a plurality of rows extending parallel to a second axis that crosses the first axis. The light turning features in all of the rows have substantially the same progression in spacing along the second axis.

In some implementations, the spacing between neighboring light turning features along the second axis is substantially uniform. According to some of these implementations, each light turning feature has an idealized location along the second axis in which the idealized location is the location of the light turning feature if all light turning features were exactly uniformly spaced along the second axis. A variance of an actual location of each light turning feature from the idealized location can be no more than about one-half of an average spacing between neighboring light turning features along the second axis, in some of these implementations.

In some other implementations, each light turning feature has an idealized location along the second axis, in which the idealized location is the location of the light turning features if each light turning feature were exactly aligned along the first axis with a plurality of other light turning features in different rows. A variance of an actual location of each light turning feature from the idealized location can be no more than about one-half of an average spacing between each of the plurality of other light turning features in different rows and corresponding neighboring light turning features along the second axis, in some of these implementations.

The array of light turning features can occupy a majority of the area of a major surface of the light guide. Alternatively or additionally, each of the light turning features can have substantially the same size. The light turning features can include isolated dot microstructures, according to certain implementations.

Light turning features in a first column substantially parallel to the first axis can be spaced differently than a plurality of light turning features in a second column substantially parallel to the first axis. The first axis can be substantially perpendicular to the second axis. Distances separating adjacent light turning features in the first column can vary in a different progression than distances separating adjacent light turning features in the second column. Alternatively or additionally, a density of light turning features in the array is varied between the first column and the second column and also varied within the plurality of rows. In some implementations, the first and second columns have approximately equal widths.

The apparatus can include a display that includes a plurality of interferometric modulator display elements.

Another innovative aspect of the disclosure can be implemented in an apparatus that includes one or more light emitters and a light guide. The light guide includes an array of light turning means, in which each light turning means is configured to turn light from the one or more light emitters. The light turning means are spaced apart along a first axis such that distances separating adjacent light turning means vary non-monotonically along the first axis. The light turning means occupy rows extending parallel to a second axis that crosses the first axis, in which neighboring light turning means in each of the rows are spaced apart from each other with substantially the same progression along the second axis.

The light turning means can be spaced-apart, reflective light turning features. Neighboring light turning features can be spaced apart from each other substantially uniformly along the second axis. The neighboring light turning features can be spaced apart from each other along the second axis within a threshold variance relative to being exactly uniformly spaced along the second axis, in which the threshold variance is no more than about one-half of an idealized exactly uniform spacing between neighboring light turning features along the second axis.

Neighboring light turning features can be spaced apart from each other along the second axis within a threshold variance relative to being exactly aligned along the first axis with other neighboring light turning features in different rows, in which the threshold variance is no more than about one-half of an average spacing between each of the plurality of other light turning features in different rows and corresponding neighboring light turning features along the second axis.

Light turning means in a first column substantially parallel to the first axis can be spaced differently than a plurality of light turning means in a second column substantially parallel to the first axis. Distances separating adjacent light turning means in the first column can vary in a different progression than distances separating adjacent light turning means in the second column. Alternatively or additionally, a density of light turning features in the array can be varied between the first column and the second column and can also be varied within the rows, in which the first axis is substantially perpendicular to the second axis.

The array of light turning means can correspond to a majority of the area of a major surface of the light guide.

The apparatus can also include a reflective display having a plurality of interferometric modulator display elements, in which the light turning means are configured to redirect light toward the reflective display.

Yet another innovative aspect of the disclosure can be implemented in a computer-implemented method performed under control of one or more configured computer systems. The method includes obtaining an intensity profile corresponding to an initial placement of light turning features within an area of a light guide; determining, based on the intensity profile, a plurality of desired pitches between pairs of light turning features along a first axis, each desired pitch corresponding to a position within the area and along the first axis; and deriving, based on the desired pitches, an updated placement of light turning features within the area, wherein one or more pitches between adjacent light turning features of the initial placement along the first axis are adjusted in the updated placement.

Pitches between pairs of adjacent light turning features along a second axis in the updated placement can have substantially the same progression along the second axis, and the second axis can be substantially orthogonal to the first axis. Pitches along the second axis in the updated placement can be substantially the same as pitches between each pair of adjacent light turning features along the second axis in the initial placement. The method can also include varying the placement of one or more light turning features in the updated placement by adjusting the placement of the one or more light turning features within a variance that is no greater than a threshold variance of about one-half of an average spacing between neighboring light turning features along the second axis.

The area can include a different number of light turning features along the first axis in the updated placement than in the initial placement. Alternatively or additionally, the area can include a region having a plurality of light turning features in the initial placement, and the deriving can include computing an adjusted length of the region along the first axis in the updated placement and maintaining an equal number of light turning features within the region in the updated placement as in the initial placement, so as to adjust a pitch between light turning features in the updated placement.

The deriving can include: increasing pitch between adjacent light turning features along the first axis for a position within the area corresponding to a light intensity hot spot in the initial placement, and decreasing pitch between adjacent light turning features along the first axis for a position within the area corresponding to a light intensity cold spot in the initial placement.

Each of the light turning features can have substantially the same size.

In the updated placement, light turning features in a first column can be spaced differently along the first axis than light turning features in a second column substantially parallel to the first column.

In the updated placement, a density of light turning features in the array can be varied between a first rectangular column of the array and a second rectangular column of the array, and wherein the first rectangular column is substantially parallel to the second rectangular column. The first rectangular column and the second rectangular column can have the same number of light turning features spaced along a second axis in both the initial placement and the updated placement, and the second axis can be substantially perpendicular to the first axis.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 11A shows an example of a plan view of a region having a fixed number of light turning features.

FIG. 11B shows an example of a plan view of two neighboring regions each having a fixed number of light turning features.

FIG. 11C shows an example of a plan view of an initial placement of light turning features in a light guide.

Like reference numbers and designations in the various drawings indicate like elements.

DETAILED DESCRIPTION

Figure 1:
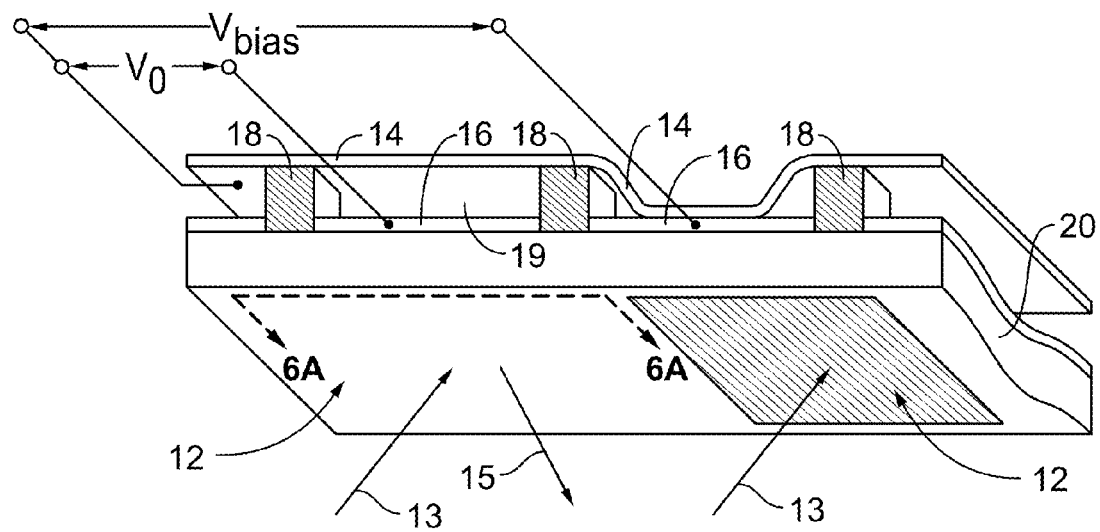
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

In some implementations, an illumination system is provided with a light guide to distribute light. The light guide may be provided with a plurality of light turning features and the placement of the light turning features in an array can be set so as to achieve a desired light distribution (e.g., a uniform distribution) within the light guide. A process of determining the desired placement can include obtaining an intensity profile corresponding to an initial placement of light turning features over an area of the light guide. Based on the intensity profile, desired pitches of light turning features along a first axis can be determined. Then, based on the desired pitches, an updated placement of light turning features within the area of the light guide can be determined. This derivation can include changing pitches along the first axis, which can in turn adjust the density of light turning features. At the same time, the pitches of light turning features along a second axis crossing the first axis (for example, orthogonally crossing the first axis) can be held unchanged. Changing pitch along one axis while keeping the pitch along the other axis roughly unchanged can adjust the density of light turning features to correct for the production of hot spots and/or cold spots by the light turning features in the initial placement.

Devices that include light turning features in the updated placement can include non-uniform spacing of light turning features along a first axis (for example, a vertical axis) and have substantially the same progression in spacing along a second axis (for example, a horizontal axis). For example, the light turning features can be non-uniformly spaced apart along the first axis such that distances separating adjacent light turning features vary non-monotonically along the first axis. The light turning features may be thought of as occupying columns extending substantially parallel to the first axis. Alternatively or additionally, different columns of the array also can have different spacing of light turning features along the first axis, where the columns are elongated along the direction of the first axis. For example, changes in distances separating adjacent light turning features in a first column can be different than changes in distances separating adjacent light turning features in a second column substantially parallel to the first column. On the other hand, the light turning features may be thought of as occupying rows extending substantially parallel to the second axis, with all of the rows having roughly the same progression in the spacing of light turning features along the second axis. In some implementations, the light turning features can have a substantially uniform spacing along the second axis. In some other implementations, the spacing between light turning features can vary along the second axis. The placement of light turning features can be varied randomly or pseudo-randomly within a variance, which may reduce undesirable visual effects, such as moiré patterns. Light guides having these light turning features can be implemented in front lights for reflective displays in some implementations, or backlights for transmissive displays in some other implementations.

Particular implementations of the subject matter described in this disclosure can be implemented to realize one or more of the following potential advantages. The relatively regular distribution of light turning features, with a roughly uniform pitch along one axis or dimension, can be more accurately simulated than distributions in which pitch varies on multiple axes. This can, for example, reduce processing power and time for determining the placement of light turning features. Moreover, the relatively regular placement of light turning features can result in less iteration and/or less complex optical simulations. Due to a relatively regular distribution of light turning features, optical simulation tools can replace one or more light turning features with an array of light turning features. This can facilitate and improve the optical simulation results for larger display panels and/or smaller light turning features. In addition, the sizes of the light turning features (e.g., surface areas occupied by the light turning features) can be kept constant, which can facilitate the manufacture of light guides with the desired placement of light turning features and the desired intensity profile for light ejected from the light guide. In some implementations, this light can be ejected to illuminate a display. As a result, patterns of light turning features can be provided for creating desirable distributions of light to illuminate the display.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
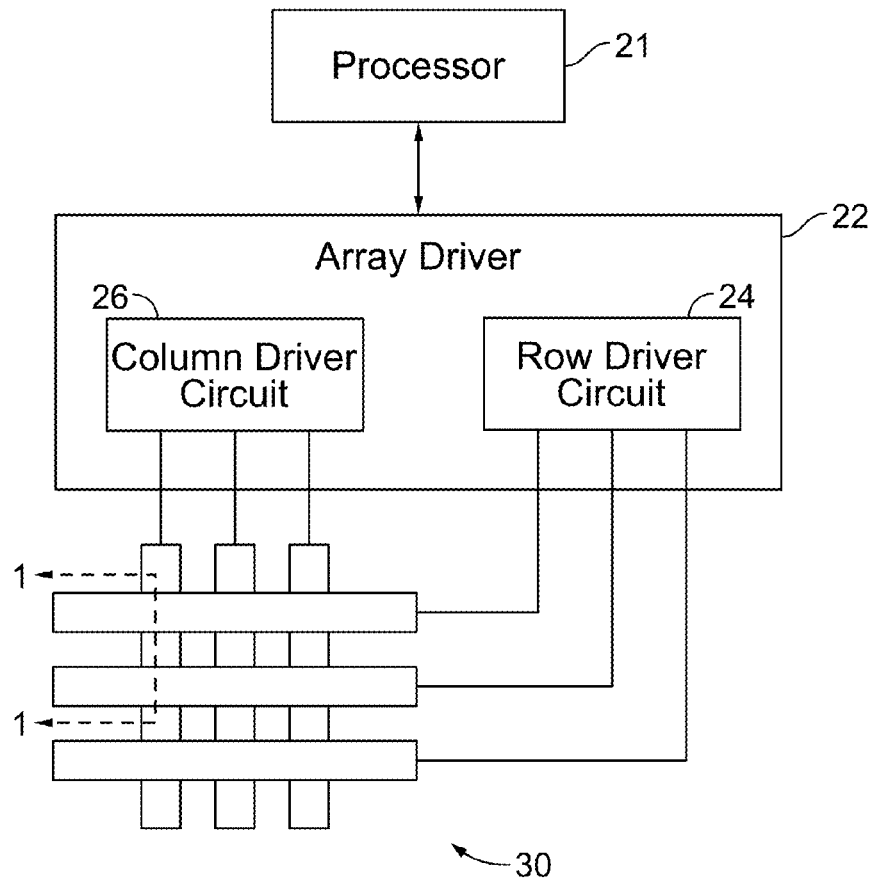
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
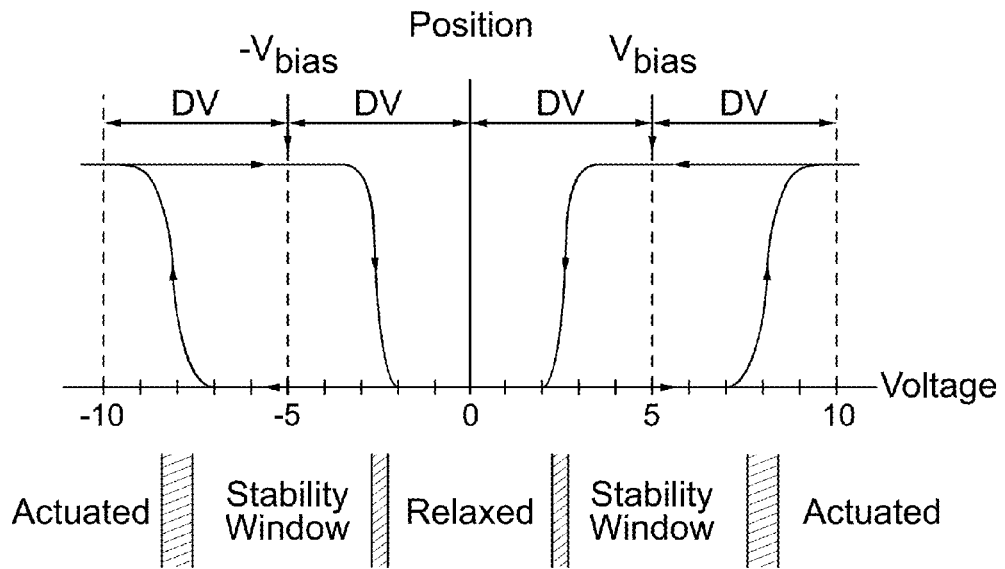
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
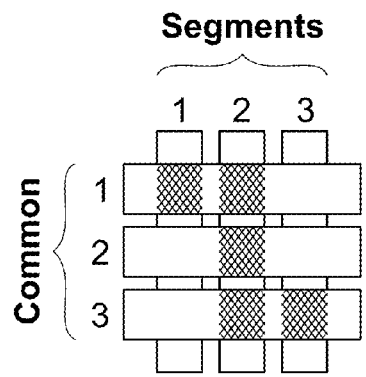
FIG. 5A shows an example of a diagram illustrating a frame of display data in the 3×3 interferometric modulator display of FIG. 2.
Figure 5B:
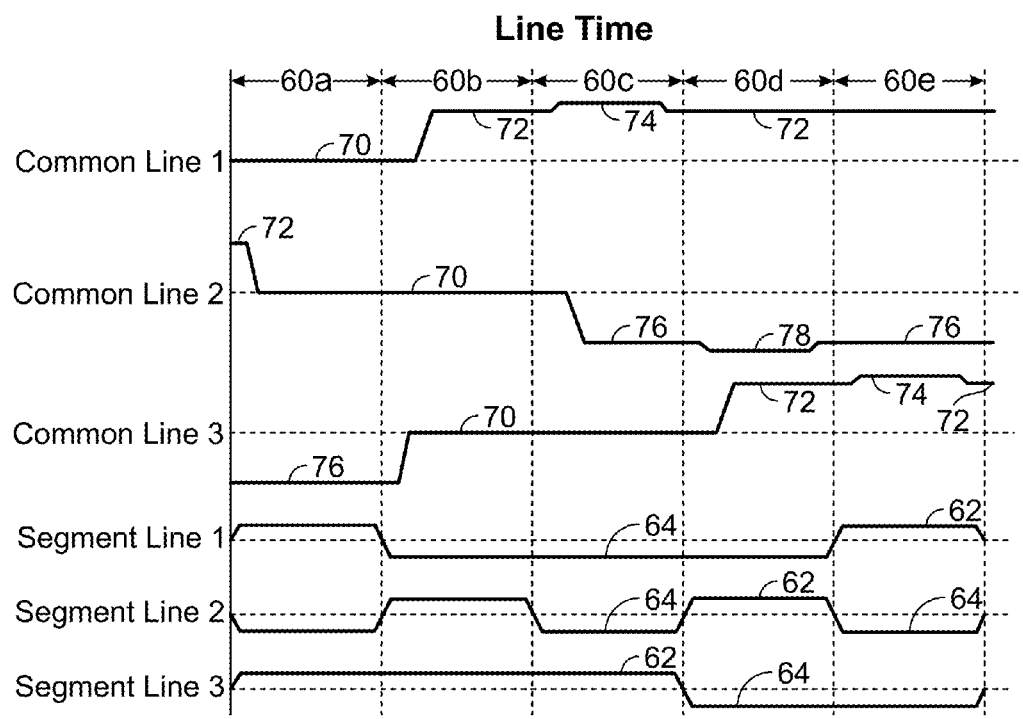
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3, 1), (3, 2) and (3, 3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1, 3) is less than that of modulators (1, 1) and (1, 2), and remains within the positive stability window of the modulator; modulator (1, 3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2, 2) is below the lower end of the negative stability window of the modulator, causing the modulator (2, 2) to actuate. Conversely, because a low segment voltage 64 is applied along segment lines 1 and 3, the modulators (2, 1) and (2, 3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3, 2) and (3, 3) actuate, while the high segment voltage 62 applied along segment line 1 causes modulator (3, 1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
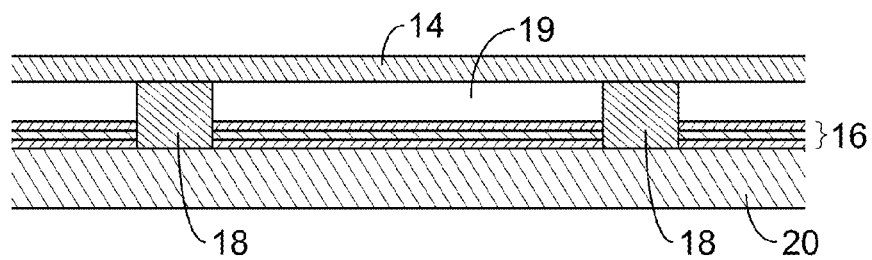
FIG. 6A shows an example of a partial cross-section of the interferometric modulator display of FIG. 1.
Figure 6B:
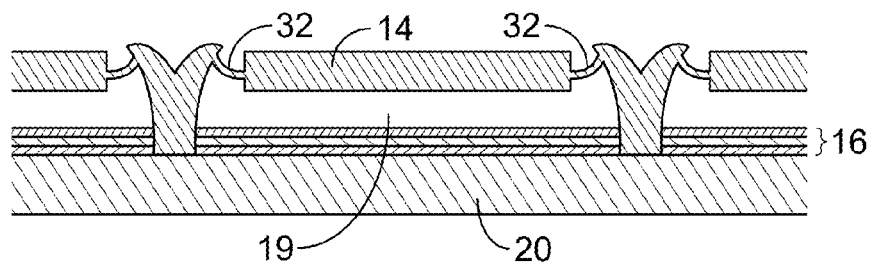
FIGS. 6B-6E show examples of cross-sections of varying implementations of interferometric modulators.
Figure 6C:
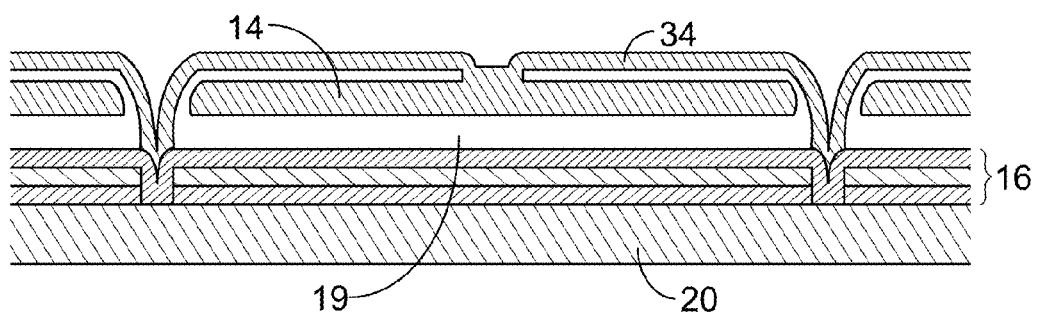

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
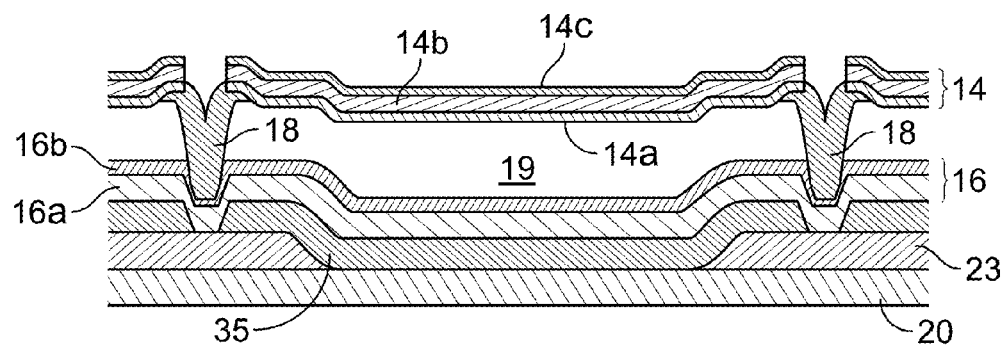

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
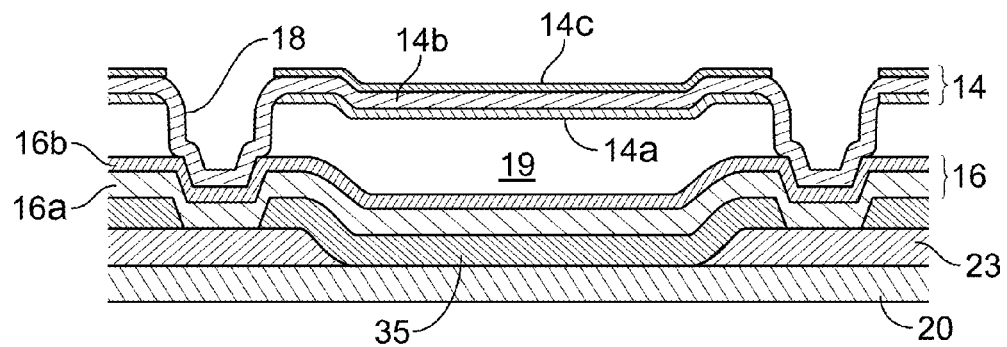

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
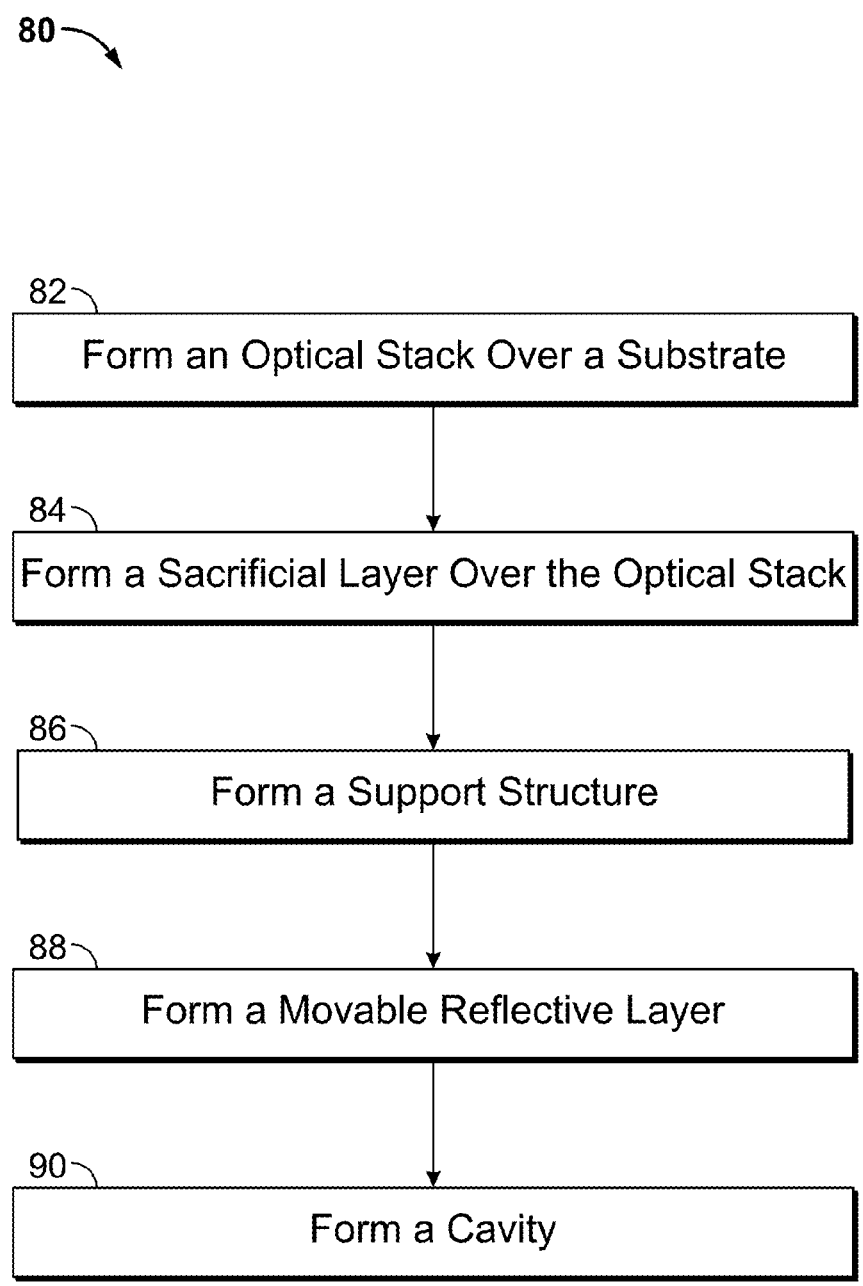
FIG. 7 shows an example of a flow diagram illustrating a manufacturing process for an interferometric modulator.
Figure 8A:
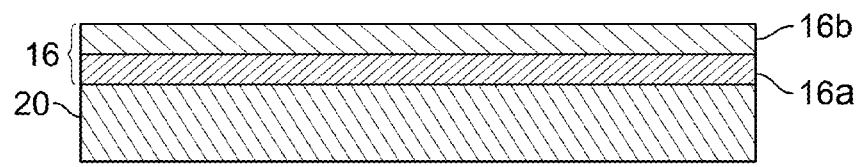
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
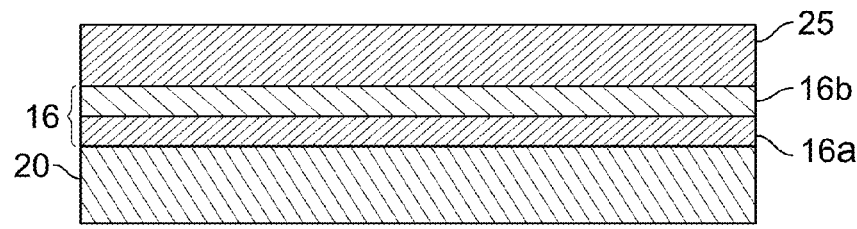

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
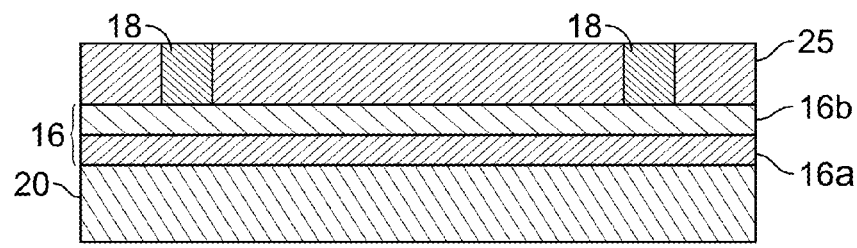

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
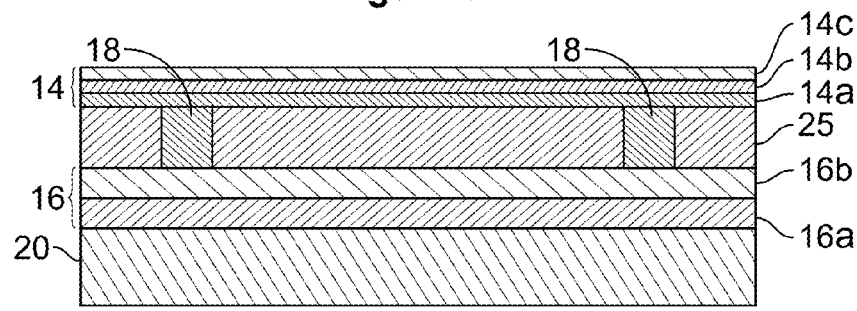
Figure 8E:
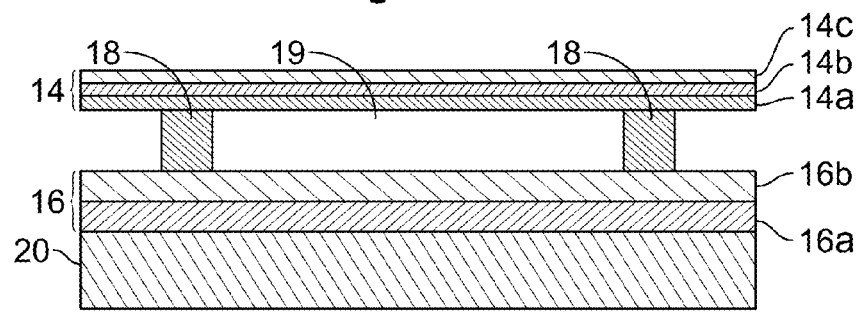

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Because reflective displays, such as those with interferometric modulator pixels, use reflected light to form images, the ambient light may be augmented to increase the brightness of the display in some environments. This augmentation may be provided by an illumination system in which light from a light source is directed to the reflective display, which then reflects the light towards a viewer.

Figure 9A:
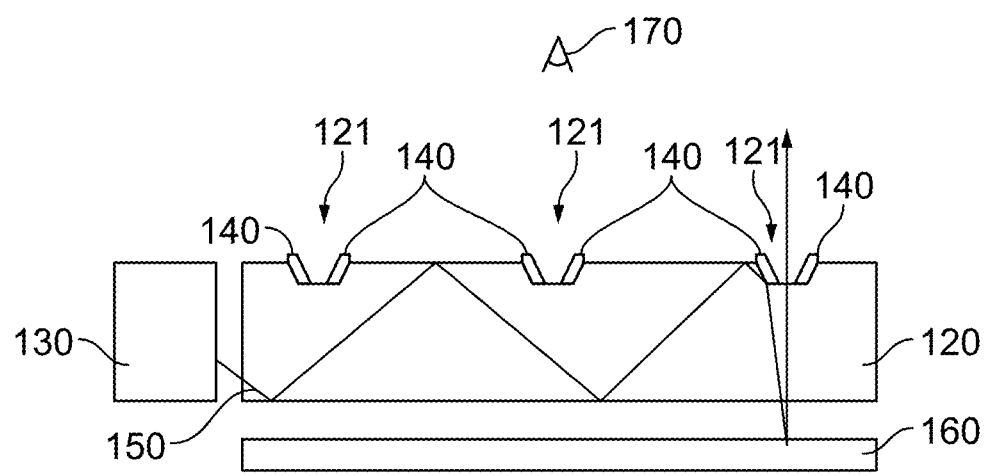
FIG. 9A shows an example of a cross-section of an illumination system.

FIG. 9A shows an example of a cross-section of an illumination system. A light guide 120 receives light from a light source 130. A plurality of light turning features 121 in the light guide 120 are configured to redirect light (e.g., light ray 150) from the light source 130 back towards, for example, an underlying reflective display 160. Reflective pixels in the reflective display 160 reflect that redirected light forward towards a viewer 170. In some implementations, the reflective pixels can be formed of IMOD's 12 (FIG. 1). Although some implementations are illustrated with a reflective display, various implementations can stand independent and apart from a display.

With continued reference to FIG. 9A, the light guide 120 may be a planar optical device disposed over and parallel to the display 160 such that incident light passes through the light guide 120 to the display 160, and light reflected from the display 160 also passes back through the light guide 120 to the viewer 170.

The light source 130 may include any suitable light source, for example, an incandescent bulb, an edge bar, a light emitting diode ("LED"), a fluorescent lamp, an LED light bar, an array of LEDs, and/or another light source. In certain implementations, light from the light source 130 is injected into the light guide 120 such that a portion of the light propagates in a direction across at least a portion of the light guide 120 at a low-graze angle relative to the surface of the light guide 120 aligned with the display 160 such that the light is reflected within the light guide 120 by total internal reflection ("TIR").

In some implementations, the light source 130 includes a light bar. Light entering the light bar from a light generating device (for example, a LED) may propagate along some or all of the length of the bar and exit out of a surface or edge of the light bar over a portion or all of the length of the light bar. Light exiting the light bar may enter an edge of the light guide 120, and then propagate within the light guide 120.

The light turning features 121 in the light guide 120 redirect the light towards display elements in the display 160 at an angle sufficient so that at least some of the light passes out of the light guide 120 to the reflective display 160. The redirected light may be considered to be extracted out of the light guide 120. The light turning features 121 may include one or more coatings (or layers) referred in the aggregate as coatings 140. The coatings 140 can be configured to increase reflectivity of the turning feature 121 and/or function as a black mask from the viewer side to improve contrast of the display 160 as observed by the viewer 170.

Figure 9B:
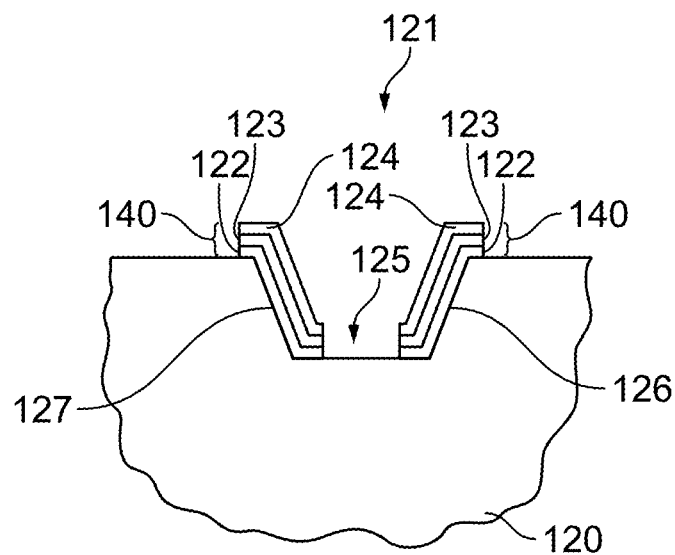
FIG. 9B shows an example of a cross-section of a light turning feature.

In certain implementations, the coatings 140 of the turning features 121 may be configured as an interferometric stack having: a reflective layer 122 that re-directs or reflects light propagating within the light guide 120, a spacer layer 123, and a partially reflective layer 124 overlying the spacer layer 123. The spacer layer 123 is disposed between the reflective layer 122 and the partially reflective layer 124 and defines an optical resonant cavity by its thickness. FIG. 9B shows an example of a cross-section of a light turning feature having such an arrangement of layers.

The interferometric stack can be configured to give the coatings 140 a dark appearance, as seem by the viewer 170. For example, as shown in FIG. 9B, light can be reflected off of each of the reflective layer 122 and partially reflective layer 124, with the thickness of the spacer 123 selected such that the light reflected off of reflective layer 122 interferes destructively with the partially light from layer 124 so that the coatings 140 appear black or dark as seem from above by a viewer.

The reflective layer 122 may, for example, comprise a metal layer, for example, aluminum (Al), nickel (Ni), silver (Ag), molybdenum (Mo), gold (Au), and chromium (Cr). The reflective layer 122 can be between about 100 Å and about 700 Å thick. In one implementation, the reflective layer 122 is about 300 Å thick. The spacer layer 123 can comprise various optically transmissive materials, for example, air, silicon oxynitride ($SiO_xN$), silicon dioxide ($SiO_2$), aluminum oxide ($Al_2O_3$), titanium dioxide ($TiO_2$), magnesium fluoride ($MgF_2$), chromium (III) oxide ($Cr_3O_2$), silicon nitride ($Si_3N_4$), transparent conductive oxides (TCOs), indium tin oxide (ITO), and zinc oxide (ZnO). In some implementations, the spacer layer 123 is between about 500 Å and about 1500 Å thick. In one implementation, the spacer layer 123 is about 800 Å thick. The partially reflective layer 124 can comprise various materials, for example, molybdenum (Mo), titanium (Ti), tungsten (W), chromium (Cr), etc., as well as alloys, for example, MoCr. The partially reflective layer 124 can be between about 20 and about 300 Å thick in some implementations. In one implementation, the partially reflective layer 124 is about 80 Å thick.

With continued reference to FIG. 9B, because the sides 126 and 127 of the light turning feature are principally used to redirect light to the display 160, in some implementations, the coatings 140 may be provided with an opening 125 through which light can travel. The opening 125 can facilitate the propagation of ambient light to the display 160 and/or the propagation of reflected light to the viewer 170.

With reference again to FIG. 9A, discrete light sources, such as LEDs, typically have a directional light output, which can produce areas of high and low light intensity within a light guide, which can in turn lead to hot and cold spots in the display 160 when the light is extracted to illuminate the display 160. A "pattern" may refer to an arrangement of light turning features across a major surface of the light guide. Two-dimensional patterns of light turning features 140, such as microstructures, can be designed so as to reduce hot and cold (bright and dark) spots in the display 160, especially in areas close to the light source, in order to produce a desirable highly uniform light intensity within the light guide. For example, the density of two-dimensional light turning features can be adjusted. More specifically, the density can be decreased for one or more hot spots and increased for one or more cold spots.

Figure 10:
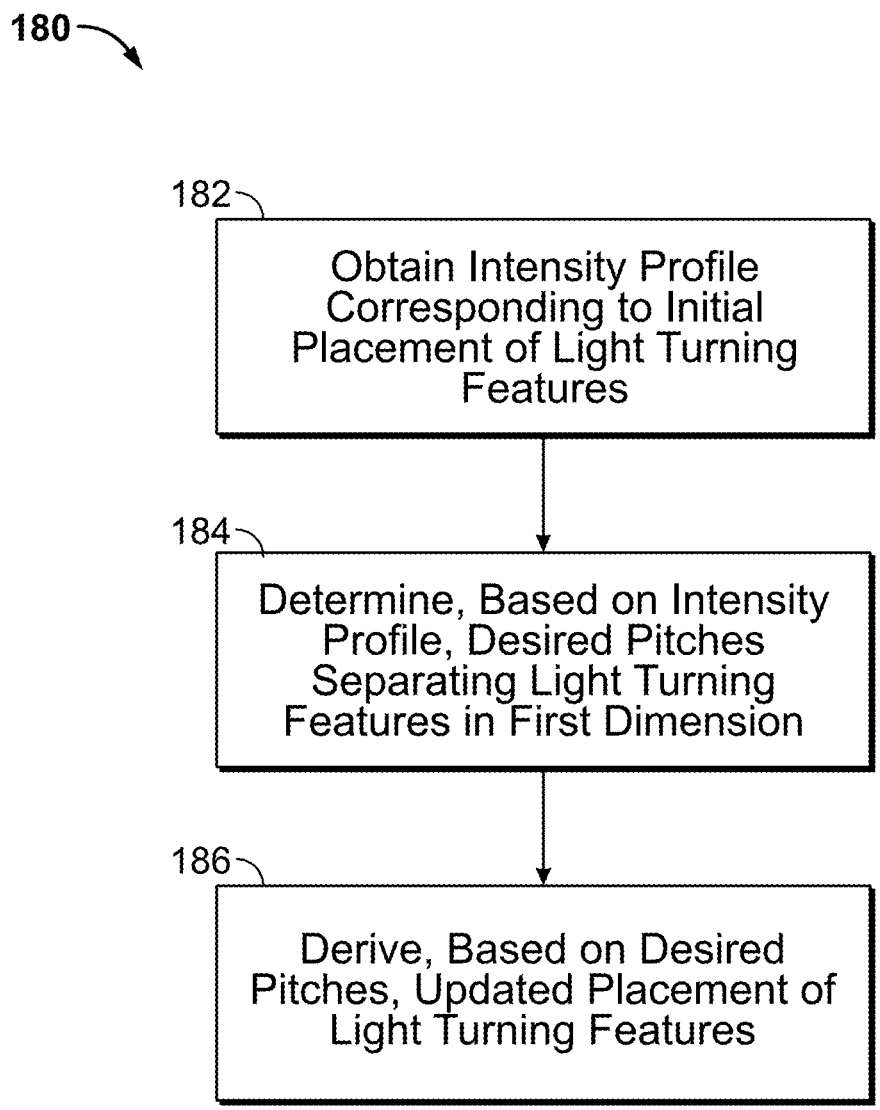
FIG. 10 shows an example of a flow diagram illustrating a process of determining a placement of light turning features in a light guide.

FIG. 10 shows an example of a flow diagram illustrating a process 180 of determining a placement of light turning features in a light guide according to some implementations. The various operations disclosed herein, including the operations of process 180, can be executed under the control of one or more computer systems configured to perform those operations. The process 180 can provide patterns of light turning features so as to adjust density of light turning features from an initial placement in a two-dimensional array of light turning features to an updated placement in the two-dimensional array. In some implementations, the process 180 can involve determining a placement of light turning features within an area on a major surface of a light guide configured to redirect light so as to achieve a substantially uniform light distribution within the light guide.

The process 180 can include obtaining an intensity profile corresponding to an initial placement of light turning features in an area of the light guide at block 182. This can include calculating pitches. As used herein "pitch" can represent the distance between a point on a first light turning feature and corresponding point (for example, a substantially identical point) on a second, neighboring light turning feature. In some implementations, the pitch can be the distance from a center point of one light turning feature to a center point of a neighboring light turning feature, for example, as illustrated in FIG. 11A. The area can include a portion or all of the two-dimensional array of light turning features. The area may be bounded by any suitable boundary, such as a rectangle, circle, or the like. In some implementations, the area can be rectangular and be oriented as a column or row.

Based on the intensity profile obtained at block 182, desired pitches of light turning features along a first axis can be determined at block 184. For example, one or more of the desired pitches can be computed by performing a linear transformation on a measured intensity. In such a linear transformation, the desired pitch can be proportional to an initial pitch multiplied by a normalized brightness. As another example, a desired pitch can be proportional to an initial pitch times the normalized brightness squared or to a power, which can be, for example, 1.2, or 1.5 in some implementations. In some other implementations, a more complex transformation function can be obtained by fitting a ratio of final placements of light turning features after iterating through the process 180 multiple times to updated placements after a first iteration of the process 180. In some implementations, the pitches of the light turning features in a particular area of the light guide are generally proportional to the light intensity in that particular area.

Each of the desired pitches can correspond to a position within the area of the light guide. Based on the desired pitches, an updated placement of light turning features within the area of the light guide can be determined at block 186. This derivation can include changing pitches along the first axis, which can in turn adjust the density of light turning features. At the same time, the pitches along a second axis can be held substantially constant. This can adjust the density to correct for the production of hot spots and/or cold spots by the light turning features in the initial placement. In some implementations, the first axis can be substantially perpendicular to the second axis.

In some implementations, distances separating light turning features can be adjusted by adjusting at least one dimension of a region that includes a fixed number of light turning features of a fixed size. Accordingly, by adjusting the size of the region, the density of light turning features is also adjusted. Each light turning feature may also be of a similar fixed size or be of different sizes. Light turning features also can be of any suitable shape. For example, in some implementations, light turning features can be circular or rectangular in shape (as seen from a top down view). In some implementations, the light turning features can include dot microstructures, which may be rotationally symmetrical and spaced-apart from one another (as seen in plan view). In some implementations, all light turning features in an array can be substantially the same shape and have the same size. Manufacturing light turning features of substantially the same shape may be less expensive and/or faster. In other implementations, two or more light turning features can have different shapes.

The process 180 can also include varying the updated placement of light turning features randomly or pseudo-randomly. For instance, the spacing separating one or more pairs of light turning features in the updated placement can be varied randomly or pseudo-randomly within a threshold variance. In some implementations, the threshold variance can be about $1/8$, about $1/4$, about $1/3$, or about $1/2$ of the average distance separating neighboring light turning features along the first axis, the second axis, or any combination thereof. Introducing randomness to the updated placement of light turning features can reduce undesirable visual effects (for example, moiré patterns) associated with a regular grid of light turning features, in some implementations.

FIG. 11A shows an example of a plan view of a region 190 having a fixed number of light turning features 192*a*, 192*b*, 192*c*, and 192*d*. Although the region 190 is illustrated as being rectangular, any suitable shape can be utilized in accordance with the principles and advantages described herein. For instance, a suitable shape may be any shape from which a tessellation can be formed. As illustrated, the region includes four light turning features 192*a*, 192*b*, 192*c*, and 192*d*. In other implementations, the region can include any suitable number of light turning features. For instance, any region described herein may include 1, 2, 4, 8, 16, 32, or more light turning features according to some implementations. Further, in some implementations, each light turning feature can represent and/or model an array of light turning features.

The region can have a length a along a first axis and a length b along a second axis. In some implementations, the length a can be about 0.1-0.3 mm. In some of these implementations, the length a can be about 0.15-0.25 mm. Similarly, the length b can be about 0.1-0.3 mm in some implementations. In some of these implementations, the length b can range be about 0.15-0.25 mm.

Each light turning feature can have a defined placement within the region, for example, the array of light turning features as a whole can be centered within the region. For example, light turning features can be spaced apart along the first axis by a pitch of half the length of the region along the first axis, i.e., $1/2$ a. In addition, in this example, each light turning feature can be spaced apart by $1/4$ a along the first axis from the nearest boundary of the region.

FIG. 11B shows an example of a plan view of two neighboring regions (for example, two of the regions 190 illustrated in FIG. 11A) each having a fixed number of light turning features. As illustrated in FIG. 11B, in two regions 190-1 and 190-2 positioned adjacent to each other, the distance between corresponding points on light turning feature 192 in a first region (for example, region 190-1) and adjacent light turning feature 192 in a second region (for example, region 190-2) can be ¼ $a_1$+¼ $a_2$, where $a_1$ can represent a length of the first region and $a_2$ can represent a length of the second region. In this example, the array of light turning features 192 can include at least four collinear light turning features 192 along the first axis with distances separating corresponding points of adjacent light turning features 192 along the first axis of ½ $a_1$, ¼ $a_1$+¼ $a_2$, and ½ $a_2$, respectively. In some implementations, the lengths $a_1$ and $a_2$ described above may not be equal to each other. Similarly, in the example illustrated in FIG. 11A, light turning features can be separated apart along the second axis by a pitch of half the length of the region along the second axis, i.e., ½ b and each light turning feature can be spaced apart by ¼ b along the second axis from the nearest boundary of the region. In two regions 190 positioned adjacent to each other both having a length of b along the second axis, the distance between a light turning feature 192 in a first region and a directly adjacent light turning feature 192 in a second region can be ½ b (i.e., ¼ b+¼ b).

An array of light turning features can include a plurality of regions, for example, a plurality of the regions 190 of FIG. 11A. In each region, a density D of light turning features can be represented by Equation 1:

$$D = m * A_{mst} / A_{reg} \quad (1)$$

In Equation 1, m can represent the number of light turning features in a region, $A_{mst}$ can represent the area of each light turning feature, and $A_{reg}$ can represent the area of the region. Since both m and $A_{mst}$ can remain fixed, a change in $A_{reg}$ can cause a change in density D of light turning features. Thus, by adjusting a length of the region in one dimension, the density of light turning features in an area that includes the region can be adjusted. For example, the density of the region 190 can be adjusted by adjusting the length a of the region 190 while leaving the number and size of the light turning features 192a, 192b, 192c, and 192d substantially the same.

FIG. 11C shows an illumination system 200 with an example of a plan view of an initial placement of light turning features 192 in a light guide 201. The light turning features 192 can extend substantially over a majority of the area of a major surface of the light guide 201. In some implementations, the light turning features 192 can extend substantially over an entirety of the major surface of the light guide 201 corresponding to a viewing area of a display (not shown) illuminated by the light guide 201. The illumination system 200 can also include a plurality of light sources 130. Although light sources 130 are illustrated as being positioned along opposing sides of the light guide 201, any suitable arrangement of light sources 130 can be implemented in accordance with any combination of features described herein. For example, the number and placement of the light turning features 192 can vary. An area can be divided into a plurality of rows and/or columns. Although some features will be described with reference to columns for illustrative purposes, any of the principles and advantages can be applied to any suitable division of an area. For example, the area can be divided into rows, diagonal sections, or the like. As illustrated in FIG. 11C, an area can be divided into a plurality of columns 202a, 202b, and 202n. In some implementations, each column can have a width of one region. In other implementations, one or more columns can have a width greater than one region. Each of these columns can be tiled with a plurality of regions, such as the regions 190 described with reference to FIG. 11A. In the initial placement, the regions can all have substantially the same area, for example, as shown in FIG. 11B. In one implementation, each region can have a size of about 0.2 mm by about 0.2 mm. Alternatively, in the initial placement, two or more regions can have different areas.

In some implementations, the length a of a region 190 along the first axis can be adjusted to vary the density of light turning features in particular parts of the array by changing the area that includes the fixed number of light features. This can reduce the intensity of hot spots and/or cold spots. In some of these implementations, the length a of the region 190 along the first axis can change but the length b of the region 190 along the second axis can remain fixed. This can result in light turning features having a non-uniform spacing along a first axis due to changes in a and uniform spacing along a second axis due to keeping b fixed.

Figure 12A:
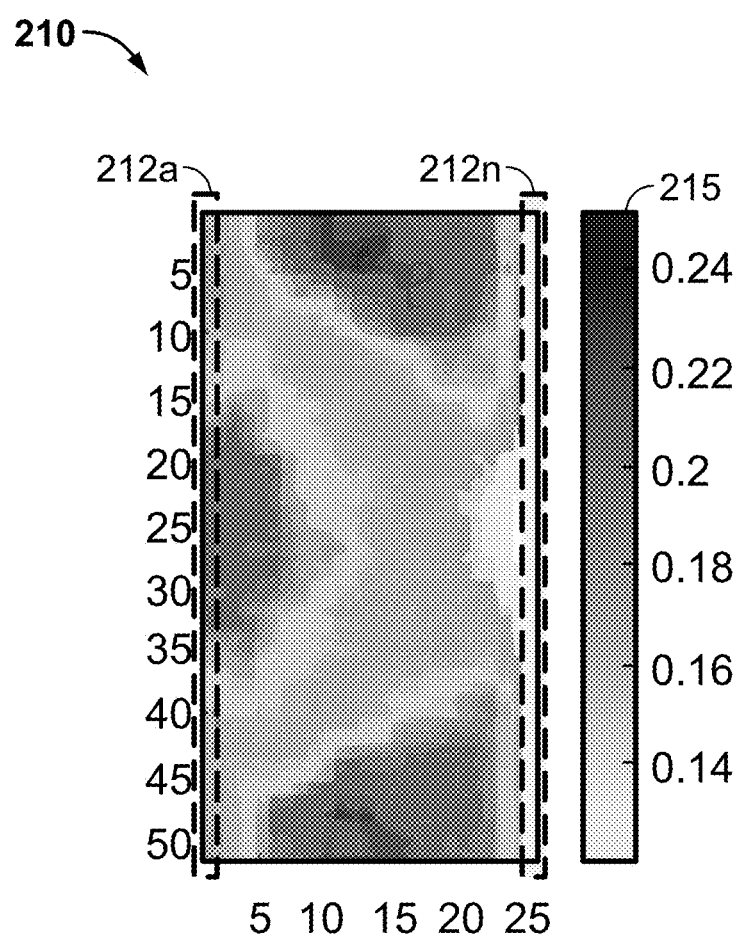
FIG. 12A shows an example of an intensity profile for an initial placement of light turning features.

FIG. 12A shows an example of an intensity profile 210 of an initial placement of light turning features. More specifically, the intensity profile 210 corresponds to the initial placement of light turning features shown in FIG. 11B and the intensity chart graphically illustrates light intensities over portions of the surface of a light guide. Regions are numbered from top to bottom along the left side of the intensity chart in FIG. 12A, and columns are numbered from left to right along the bottom of the area in FIG. 12A. Although some of the regions described herein (for example, the region 190 of FIG. 11A) include four light turning features for illustrative purposes, any of the regions described herein can include any suitable number of light turning features according to certain implementations. A first column 212a of the intensity profile 210 can correspond to a first column 202a of FIG. 11C. In the first column 212a of the intensity profile 210 indicates that regions 1-12 and 42-50, roughly, correspond to cold spots and regions 14-40, roughly, correspond to hot spots. Accordingly, the pitches of light turning features in positions of the first column 202a of FIG. 11C corresponding to hot spots can be increased and the pitches of light turning features in positions of the first column 202a of FIG. 11C corresponding to cold spots can be decreased, so as to achieve a more uniform light intensity distribution. Any of these principles can be applied to one or more other columns, such as column 212n of the intensity profile corresponding to a last column 202n of FIG. 11C.

Figure 12B:
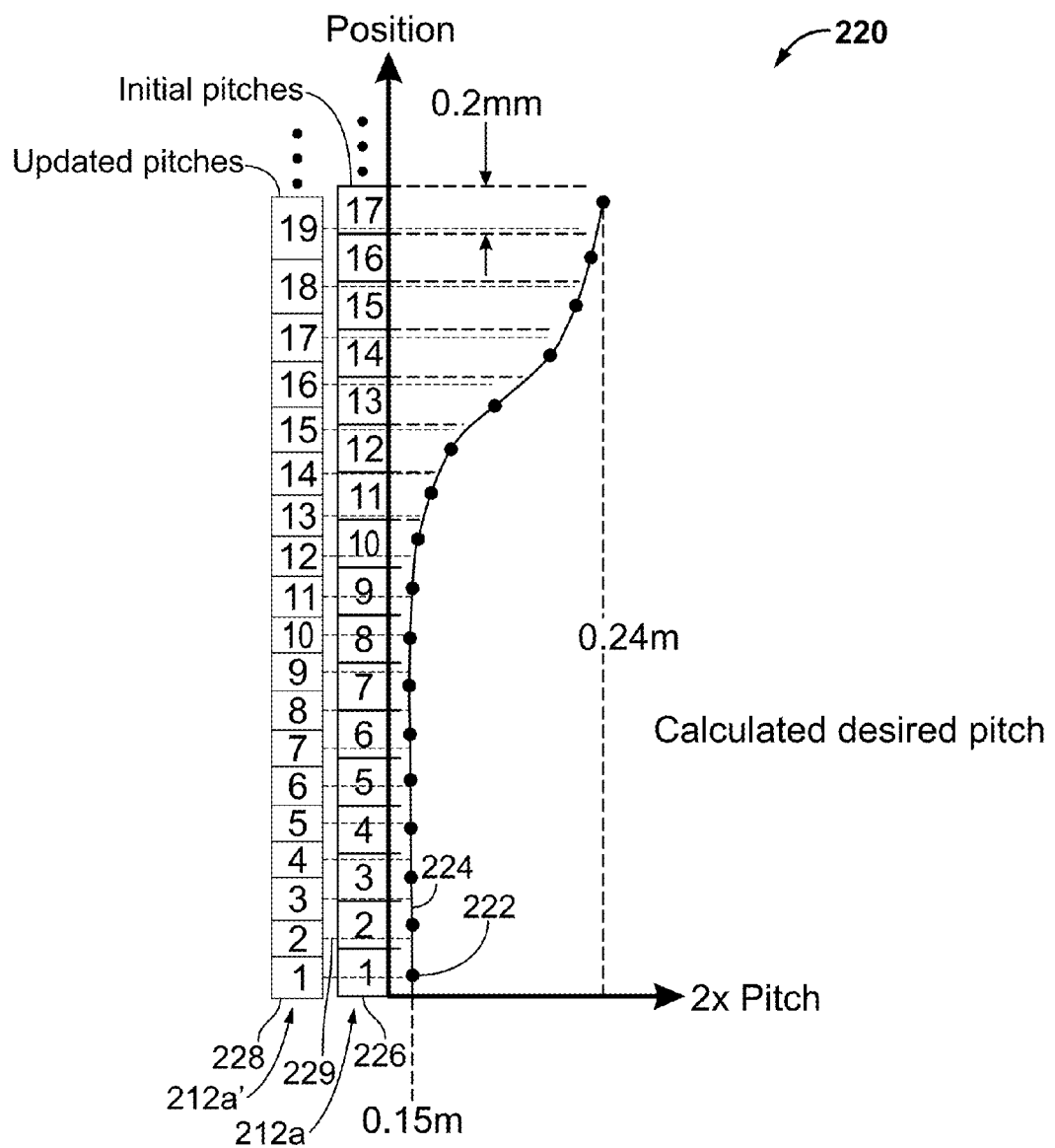
FIG. 12B shows an example of a curve of desired pitches computed based on the intensity profile of FIG. 12A.
Figure 12C:
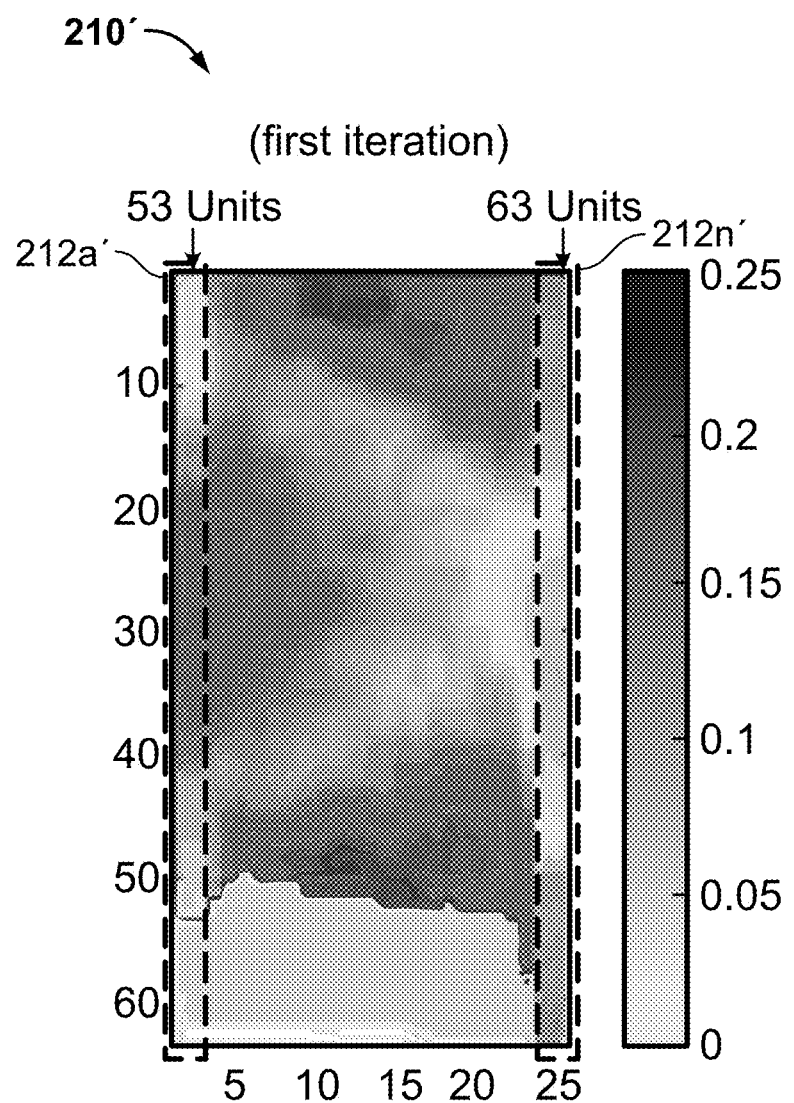
FIG. 12C shows an example of an intensity profile of an updated placement of light turning features determined based on the curve of desired pitches of FIG. 12B.

FIG. 12B shows an example of a curve 220 of desired pitches computed based on the intensity profile of FIG. 12A according to one implementation. More specifically, the horizontal axis on the graph indicates values that are two times the desired pitch at positions along a column, such as one of the columns 202a, 202b, and 202n (FIG. 11C). In the illustrated implementation, the positions correspond to positions along the column 202a (FIG. 11C). For the regions 190 described earlier in FIG. 11A, the length a is two times the pitch in the corresponding dimension. Thus, twice the pitch corresponds to the length a and the curve 220 can be used to determine the length a for each region 190. In some implementations, the desired pitches can be computed based on a linear transformation of intensities corresponding to individual regions. As illustrated, the y-axis represents two times a desired pitch of adjacent light turning features along a vertical axis of FIG. 11C (for example, the length a of a region 190 of FIG. 11A) and the x-axis represents a position in the first column 202a (FIG. 11C) along the vertical axis. Along the x-axis, boxes 226 illustrating the pitches of regions in the initial placement corresponding to the intensity profile 210 of FIG. 12A are shown above boxes 228 illustrating pitches of regions in the updated placement. FIG. 12C shows an example of the intensity profile 210' of the updated placement of light turning features determined based on the curve of desired pitches of FIG. 12B.

With reference again to FIG. 12B, the data shown in FIG. 12B corresponds to an intensity profile of an initial placement in which adjacent light turning features have a pitch of about 0.1 mm along the vertical axis. Regions 1-12, roughly, of the first column 212a of the intensity profile correspond to cold spots and regions 14-17, roughly, of the first column 212a of the intensity profile correspond to hot spots. For each region, a desired pitch can be computed based on the intensity profile 210 of FIG. 12A. The desired pitch can be lower for cold spots and higher for hot spots, since reducing pitch can increase the amount of extracted light by increasing the density of light turning features (to prevent cold spots) and increasing pitch can decrease light extraction by decreasing the density of light turning features (to reduce intensity of hot spots).

Based on the desired pitches, the pitch of adjacent light turning features in a region can be adjusted in one dimension. Although the desired pitches for the first column 202a of the array of the light guide 201 are shown in FIG. 12B, this process can be applied to each column in the array. An arbitrary starting point can be chosen to start the process, for example, region 1 of the first column 202a. The length a of region 1 can correspond to two times the pitch for the example region 190 illustrated in FIG. 11A. The pitch can be adjusted for the initial region corresponding to the starting point based on the desired pitch of initial region. For instance, if region 1 is the initial region, the length of region 1 along a first axis can be adjusted from 0.2 mm to 0.15 mm based on the graph of desired pitches in FIG. 12B. This can result in the distance separating two adjacent light turning features along the vertical axis of region 1 going from 0.1 mm to 0.75 mm.

Since the next region will start at a different point along the vertical axis than region 2 as illustrated in FIG. 12B, in this example, a desired pitch of light turning features along the vertical axis of the next region can be computed based on interpolating a desired pitch from the desired pitch associated with region 1 and the desired pitch associated with region 2. The "next" region can be a directly neighboring region. In some implementations, each region in the initial placement represented by a box 226 can correspond to a discrete point 222 on the curve 220 of desired pitch. Each discrete point 222 can correspond to twice the calculated desired pitch at a particular position of a region, for example, the center of the region along the first axis. The curve 220 can be derived from a plurality of discrete points 222. For example, in some implementations, portions 224 of the curve 220 between adjacent discrete points 222 can be interpolated from the adjacent discrete points 222. The desired pitch corresponding to the length of the next adjacent region along the first axis can be computed based on a point on the curve 220 corresponding to a point of the next region in the updated placement. For example, the length of the next region along the first axis can be computed based on a point on the curve 220 corresponding to the center of a box 228 associated with the next region in the updated placement as illustrated by dotted lines 229. In this example, the boxes 228 can correspond to regions in an updated placement with pitches along the first axis derived based on the curve 220. This process can be carried out for each column until the array is filled with regions of adjusted size. In some implementations, once an initial starting region is chosen, the column is filled with adjusted regions. The initial starting region can be adjusted first, and then an immediately adjacent region can be adjusted. Thereafter, regions immediately adjacent to already adjusted regions can be adjusted until a column is filled.

By adjusting the size of the regions and keeping the area and number of light turning features fixed within each region, the density of light turning features can be adjusted. At the same time, the pitch can also be adjusted along a first axis such that the pitch is adjusted proportionally to the length of a region along the first axis. This can improve the uniformity of the intensity profile. Alternatively or additionally, this process can be utilized to achieve any desired intensity profile, including intensity profiles that are uniform or have non-uniformities. This process of adjusting array density can be iterated until a desired intensity profile is obtained.

With reference again to FIG. 12C, the intensity profile 210' of an updated placement of light turning features that was determined based on the curve 200 of desired pitches of FIG. 12B is shown. As illustrated, the light intensity can be more uniform (as compared to the intensity profile 210 of FIG. 12a) after a first iteration. More specifically, a first column 212a' of the intensity profile 210' has fewer hot spots and fewer cold spots than the corresponding first column 212a of the intensity profile 210 of FIG. 12A. Similarly, a last column 212n' of the intensity profile 210' has fewer hot spots and cold spots than the corresponding last column 212n of the intensity profile 210 of FIG. 12A. In some implementations, two or more iterations of determining desired pitches and updated placements can be carried out and each iteration can be performed according to the process 180 of FIG. 10. Such iteration can be carried out until the intensity profile of an updated placement converges to a desired intensity profile. For instance, in some implementations, three iterations can converge on a desired intensity profile.

Figure 13A:
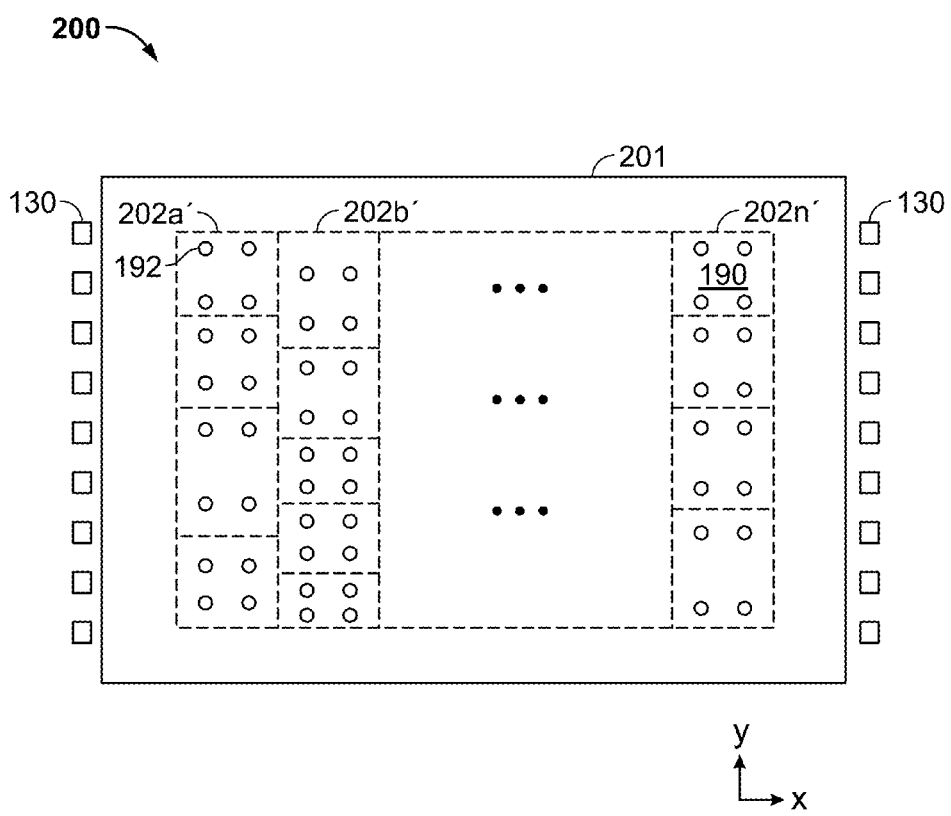
FIG. 13A shows an example of a plan view of an updated placement of light turning features in a light guide.

FIG. 13A shows an example of a plan view of an updated placement of light turning features 192 in a light guide 201 according to one implementation. As shown in FIG. 13A, the light turning features 192 can have non-uniform spacing along a first axis (for example, the y-axis) and substantially regular spacing along a second axis (for example, the x-axis). With regular spacing along the second axis, light turning features in different rows that are parallel to the second axis can be aligned along axes that are orthogonal to the rows. Referring to the example implementation of FIG. 13A, each of the columns 202a', 202b', and 202n' includes light turning features 192 with different pitches along a first axis (the y-axis, as illustrated). At the same time, the pitches of light turning features 192 along a second axis (the x-axis, as illustrated) can be uniform. In some implementations, each of the light turning features 192 can align in columns substantially parallel to the x-axis. Although pitches of adjacent light turning features along the second axis are uniform, the pitches of adjacent light turning features 192 along the second axis need not be the same. For example, the columns 202a', 202b', and 202n' of light turning features 192 illustrated in FIG. 13A need not be uniformly spaced apart, and thus may be non-uniform. Similarly, the pitches of the light turning features 192 along the second axis may be non-uniform, in some implementations. Light turning features can have the same progression in different rows that are parallel to the second axis. For instance, with the same progression, light turning features in different rows can align with along axes orthogonal to the rows.

As another example, with reference again to FIG. 12C, a first column 212a' of the intensity profile 210' corresponds to a column with 53 regions and a last column 212n' of the intensity profile 210' of FIG. 12C corresponds to a column with 63 regions. Because each of these corresponding regions can include the same number of light turning features 192, the regions can include light turning features 192 having different pitches along the vertical axis. In addition, the placement of the light turning features 192 can be proportional to dimensions a and b of the region, such that when a is adjusted the placement of light turning features 192 will include a proportional change in the vertical pitch, for example, as described above.

Figure 13B:
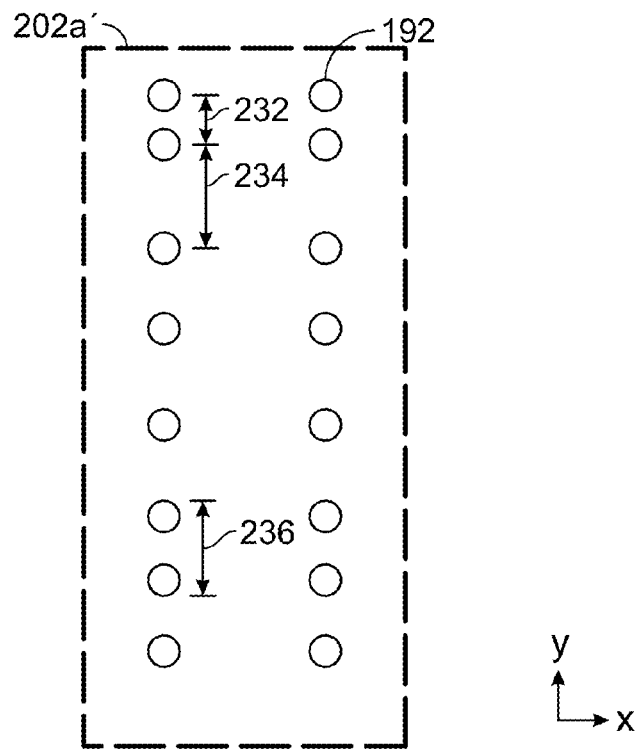
FIG. 13B shows an example of a plan view of a column of light turning features in the updated placement of light turning features of FIG. 13A.

FIG. 13B shows an example of a plan view of the first column 202a' of light turning features 192 in the updated placement of light turning features 192 illustrated in FIG. 13A. While the first column 202a' is shown for illustrative purposes, properties of the pitches of light turning features 192 in the first column 202a' can also apply to one or more other columns in the light guide 201, such as, for example, the second column 202b' and the last column 202n'. As illustrated, the light turning features 192 are non-uniformly spaced apart along the y-axis in the first column 202a' such that distances separating adjacent light turning features vary non-monotonically along the y-axis. For example, pitches 232, 234, and 236 of the light turning features 192 along the y-axis are different from one another and may both increase and decrease, relative to one another, as they progress along the y-axis from one end of the column 202a' to the opposite end of that column. For example, the pitch 234 is greater than the pitch 236 and the pitch 234 corresponds to light turning features with a greater position along the y-axis than light turning features corresponding to the pitch 236. In addition, the pitch 234 is greater than the pitch 232 and the pitch 232 corresponds to light turning features with a greater position along the y-axis than light turning features corresponding to the pitch 234. The pitches of light turning features 192 of the first column 202a' can be varied, as shown in FIG. 13B, for example, to achieve a desired light distribution in a light guide. In some implementations, this can remove hot spots and/or cold spots resulting from discrete light sources, such as LEDs.

Figure 13C:
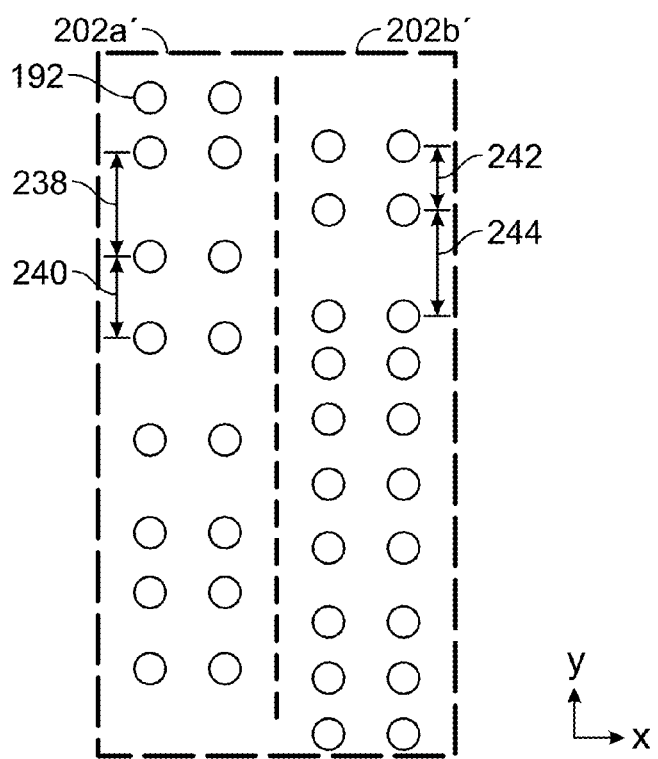
FIG. 13C shows an example of a plan view of two columns of light turning features in the updated placement of light turning features of FIG. 13A.

FIG. 13C shows an example of a plan view of the first column 202a' of light turning features 192 and a second column 202b' of light turning features 192 in the updated placement of light turning features 192 illustrated in FIG. 13A. Any two columns of the light turning features 192 of the light guide 201 can include light turning features 192 that are irregularly spaced apart along a first axis and light turning features in the array are regularly spaced apart along a second axis that crosses the first axis. More specifically, changes in distances separating adjacent light turning features 192 in the first column 202a' can be different than changes in distances separating adjacent light turning features 192 in the second column 202b'. For instance, distances 238 and 240 separating adjacent light turning features 192 in the first column 202a' vary in a different progression than distances 242 and 244 separating adjacent light turning features 192 in the second column 202b'. For example, as position along the y-axis increase, the pitches in the first column 202a' initially increase at a greater rate than pitches in the second column 202b'. As a result of the pitches of the light turning features 192 illustrated in FIG. 13C, the first column 202a' can have a different density of light turning features 192 than the second column 202b'. The pattern of light turning features 192 in the first column 202a' and the second column 202b' can be implemented to achieve a desired light distribution in a light guide with light turning features 192 having a fixed size. In some implementations, such a pattern can provide a substantially uniform light intensity profile, even when implemented in connection with discrete light sources, such as LEDs.

FIGS. 14A through 14D show examples of plan views of rows of light turning features in an updated placement of light turning features. The patterns of light turning features 192 illustrated in these figures can correspond to the updated placement after the performing the process 180 described with reference to FIG. 10. As illustrated in FIGS. 14A through 14D, an array of light turning features 192 can be divided into a plurality of rows, including rows 252a and 252b or 254a and 254b. Light turning features 192 can occupy a plurality of rows, including rows 252a and 252b or 254a and 254b, extending parallel to a second axis (the horizontal axis as illustrated) that crosses a first axis (the vertical axis as illustrated) along which distances separating adjacent light turning features vary non-monotonically. The rows 252a, 252b, 254a, and 254b shown in FIGS. 14A through 14D are provided for illustrative purposes and it will be understood that the rows can be drawn a number of different ways such that light turning features 192 occupy rows extending parallel to the second axis. In some implementations, each row can have substantially the same height. Each of the rows can include one or more light turning features 192 that are aligned along the first axis with light turning features 192 in one or more different rows. Rows 252a, 252b, 254a, 254b, or any combination thereof can be substantially rectangular.

Figure 14A:
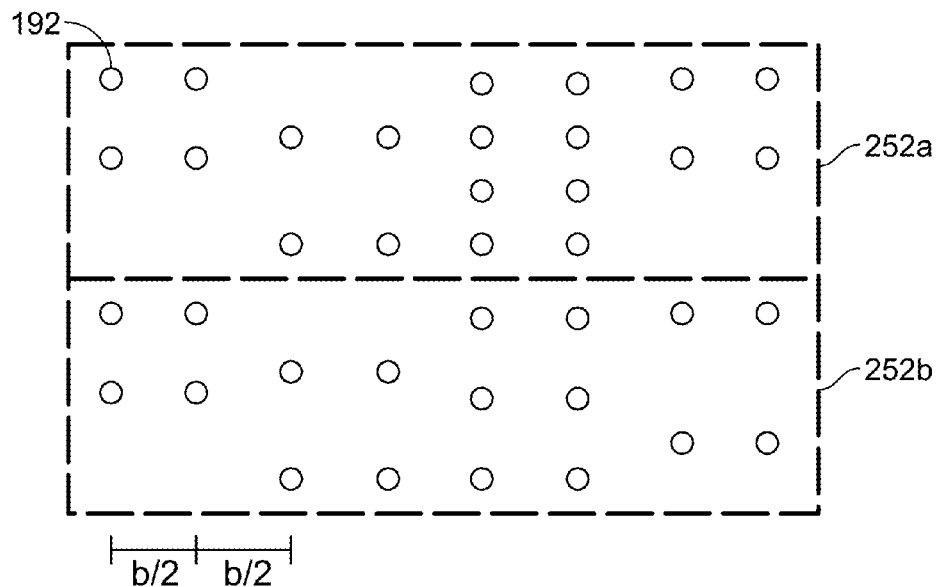
FIGS. 14A-14D show examples of plan views of rows of light turning features in an updated placement of light turning features.

In the implementation shown in FIG. 14A, light turning features 192 occupying rows 252a and 252b can be uniformly spaced apart by a distance of b/2 along the second axis. Accordingly, the light turning features 192 can be aligned along the first axis, which is orthogonal to the second axis. Different rows 252a and 252b can include different numbers of light turning features 192 aligned along the first axis. However, light turning features 192 may not be aligned with each other along the second axis within a row, as illustrated in FIG. 14A.

Figure 14B:
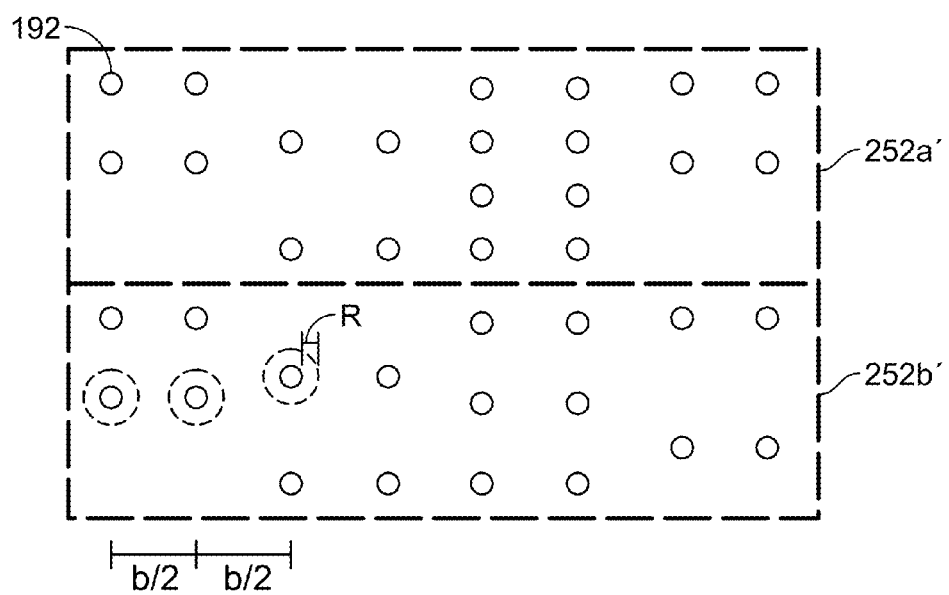

In the implementation shown in FIG. 14B, one or more light turning features 192 occupying rows 252a' and 252b' can be randomly or pseudo-randomly varied within a variance relative to the placement of light turning features shown in FIG. 14A. The locations of light turning features 192 shown in FIG. 14A can represent idealized locations of light turning features 192 along the second axis. The idealized locations can represent the locations of the light turning features 192 when all light turning features 192 are exactly uniformly spaced along the second axis. The variance of an actual location of each light turning feature from the idealized location can be represented by a variance, which can be, for example, about ⅛, about ¼, about ⅓, or about ½ of an average distance separating neighboring light turning features along the second axis.

In some implementations, any of the light turning features 192 can be varied within a variance, which can be represented schematically as a circle surrounding the light turning features 192, the circle having a radius of R. As illustrated in FIG. 14B, the total width of the variance can be 2R. In other implementations, the placement of a light turning feature 192 can be randomly or pseudo-randomly varied within a different shape, such as an oval. And in other implementations, the placement of a light turning feature 192 can be varied along an axis, such as the second axis, while remaining substantially constant along another substantially orthogonal axis, such as the first axis. Varying the position of one or more light turning features 192 along one axis while keeping substantially the same positions along another orthogonal axis can be a way of randomizing placements while keeping down computational complexity.

Figure 14C:
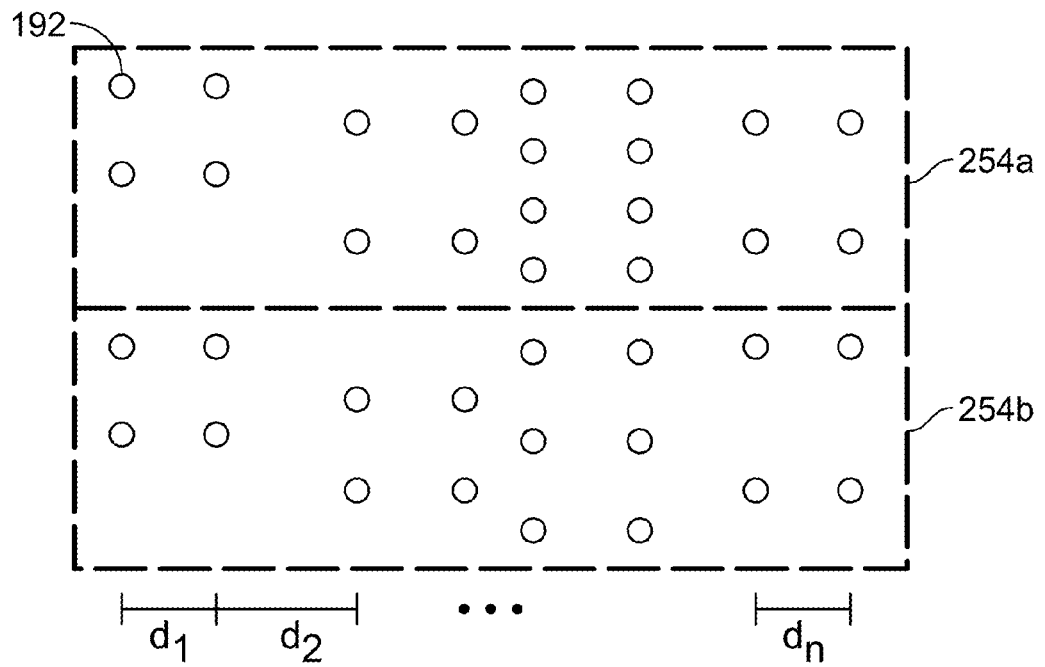

Referring to FIG. 14C, light turning features 192 occupying rows 254a and 254b can have the same progression in spacing along the second (horizontal) axis. As shown in FIG. 14C, the light turning features 192 can be aligned along the first (vertical) axis, which is orthogonal to the second axis. The spacing separating neighboring light turning features 192 can increase and/or decrease along the second axis. For instance, as illustrated in FIG. 14C, a first pair of neighboring light turning features 192 can be separated by a distance d1 and a second pair of neighboring light turning features 192 can be separated by a distance d2 that is greater than d1.

Figure 14D:
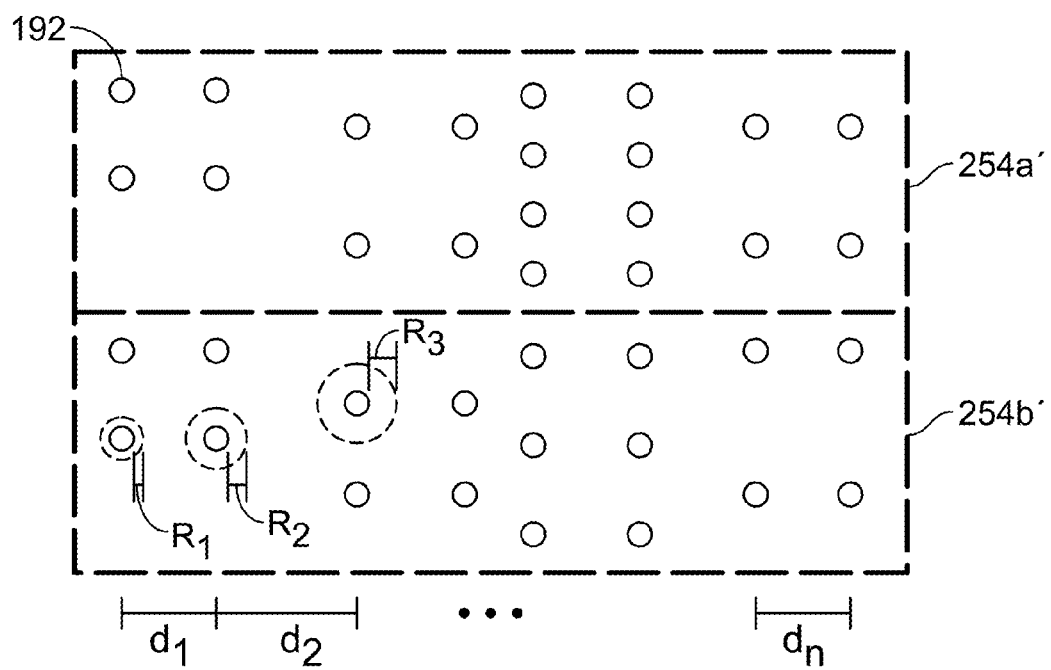

In the implementation shown in FIG. 14D, the position of one or more light turning features 192 occupying rows 254a' and 254b' can be randomly or pseudo-randomly varied within a variance relative to the placement of light turning features 192 in rows 254a and 254b shown in FIG. 14C. The pattern of light turning features shown in FIG. 14C can represent idealized locations of light turning features 192 where each light turning feature 192 is exactly aligned along the first axis with a plurality of other light turning features 192 in different rows. In the implementation of FIG. 14D, the placement of light turning features 192 can be varied within a variance of an actual location of each light turning feature from the idealized location. The variance can be, for example, about ⅛, about ¼, about ⅓, or about ½ of an average spacing between each of the plurality of other light turning features in different rows and corresponding neighboring light turning features along the second axis.

The placement of light turning features can be varied, for example, using any combination of features described with reference to FIG. 14B. Since some neighboring light turning features 192 are spaced apart from each other by a different distance along the second axis in the implementation shown in FIG. 14D, the placement of light turning features 192 can be varied by a different amount depending on the spacing separating a neighboring light turning feature. For instance, a first light turning feature 192 can vary by a variance of $2R_1$, a second light turning feature 192 can vary by a variance of $2R_2$ that is greater than $2R_1$, and a third light turning feature 192 can vary by a variance of $2R_3$ that is greater than $2R_2$. In this way, light turning features 192 can be varied within a threshold variance. In some other implementations, the variance allowed for the position of each light turning feature 192 in an array is the same.

Figure 15A:
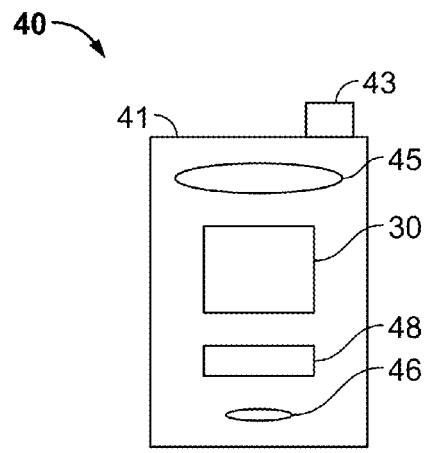
FIGS. 15A and 15B show examples of system block diagrams illustrating a display device that includes a plurality of interferometric modulators.
Figure 15B:
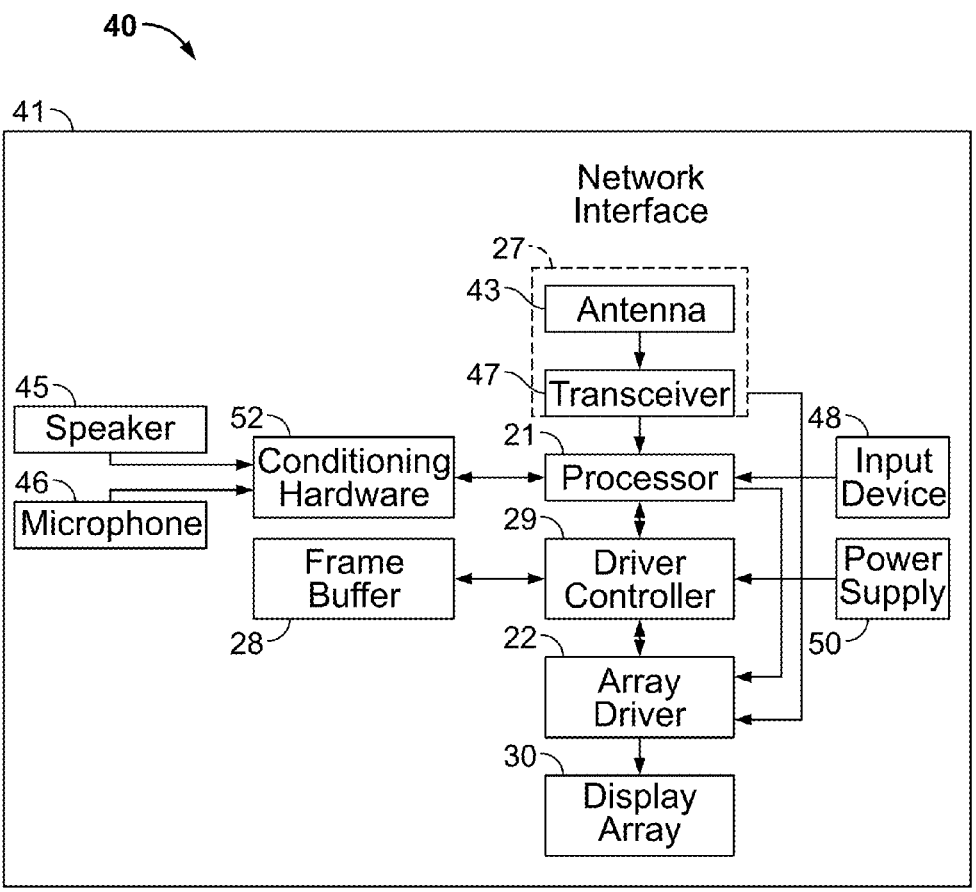

FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An illumination apparatus comprising:
 one or more light emitters; and
 a light guide comprising:
  an array of light turning features, each light turning feature of the array having substantially the same size and being configured to turn light from at least one of the one or more light emitters,
  wherein the light turning features are non-uniformly spaced apart along a first axis such that distances separating adjacent light turning features vary non-monotonically along the first axis, and
  wherein the light turning features occupy a plurality of rows extending parallel to a second axis that crosses the first axis, wherein the light turning features in all of the rows have substantially the same progression in spacing along the second axis, and
  wherein light turning features in a first column substantially parallel to the first axis are spaced differently than a plurality of light turning features in a second column substantially parallel to the first axis.

2. The apparatus of claim 1, wherein the spacing between neighboring light turning features along the second axis is substantially uniform.

3. The apparatus of claim 2, wherein each light turning feature has an idealized location along the second axis, the idealized location being the location of the light turning feature if all light turning features were exactly uniformly spaced along the second axis, wherein a variance of an actual location of each light turning feature from the idealized location is no more than about one-half of an average spacing between neighboring light turning features along the second axis.

4. The apparatus of claim 1, wherein each light turning feature has an idealized location along the second axis, the idealized location being the location of the light turning features if each light turning feature were exactly aligned along the first axis with a plurality of other light turning features in different rows, wherein a variance of an actual location of each light turning feature from the idealized location is no more than about one-half of an average spacing between each of the plurality of other light turning features in different rows and corresponding neighboring light turning features along the second axis.

5. The apparatus of claim 1, wherein the array of light turning features occupies a majority of the area of a major surface of the light guide.

6. The apparatus of claim 1, wherein distances separating adjacent light turning features in the first column vary in a different progression than distances separating adjacent light turning features in the second column.

7. The apparatus of claim 1, wherein a density of light turning features in the array is varied between the first column and the second column and also varied within the plurality of rows.

8. The apparatus of claim 7, wherein the first axis is substantially perpendicular to the second axis.

9. The apparatus of claim 1, wherein the first and second columns have approximately equal widths.

10. The apparatus of claim 1, wherein the first axis is substantially perpendicular to the second axis.

11. The apparatus of claim 1, wherein the array of light turning features includes at least four substantially collinear light turning features along the first axis, the at least four light turning features including a first light turning feature, a second light turning feature, a third light turning feature, and a fourth light turning feature,
 wherein the first light turning feature is adjacent to the second light turning feature along the first axis, the first light turning feature spaced from the second light turning feature by a distance of about a1 along the first axis,
 wherein the second light turning feature is adjacent to the third light turning feature along the first axis, the second light turning feature spaced from the third light turning feature by a distance of about ½ a1+½ a2 along the first axis, and
 wherein the third light turning feature is adjacent to the forth light turning feature along the first axis, the third light turning feature spaced from the fourth light turning feature by a distance of about a2 along the first axis.

12. The apparatus of claim 1, further comprising:
 a display;
 a processor that is configured to communicate with the display, the processor being configured to process image data; and
 a memory device that is configured to communicate with the processor.

13. The apparatus as recited in claim 12, further comprising:
   a driver circuit configured to send at least one signal to the display.

14. The apparatus as recited in claim 13, further comprising:
   a controller configured to send at least a portion of the image data to the driver circuit.

15. The apparatus as recited in claim 12, further comprising:
   an image source module configured to send the image data to the processor.

16. The apparatus as recited in claim 15, wherein the image source module includes at least one of a receiver, transceiver, and transmitter.

17. The apparatus as recited in claim 12, further comprising:
   an input device configured to receive input data and to communicate the input data to the processor.

18. The apparatus as recited in claim 12, wherein the display comprises a plurality of interferometric modulator display elements.

19. The apparatus of claim 1, wherein the light turning features include isolated dot microstructures.

20. An apparatus comprising:
   one or more light emitters; and
   a light guide comprising:
      an array of light turning means, each light turning means configured to turn light from the one or more light emitters,
      wherein the light turning means are spaced apart along a first axis such that distances separating adjacent light turning means vary non-monotonically along the first axis,
      wherein the light turning means occupy rows extending parallel to a second axis that crosses the first axis, wherein neighboring light turning means in each of the rows are spaced apart from each other with substantially the same progression along the second axis,
      wherein light turning means in a first column substantially parallel to the first axis are spaced differently than a plurality of light turning means in a second column substantially parallel to the first axis, and
      wherein each of the light turning means have substantially the same size.

21. The apparatus of claim 20, wherein the light turning means are spaced-apart, reflective light turning features.

22. The apparatus of claim 21, wherein the neighboring light turning features are spaced apart from each other substantially uniformly along the second axis.

23. The apparatus of claim 22, wherein the neighboring light turning features are spaced apart from each other along the second axis within a threshold variance relative to being exactly uniformly spaced along the second axis, wherein the threshold variance is no more than about one-half of an idealized exactly uniform spacing between neighboring light turning features along the second axis.

24. The apparatus of claim 21, wherein neighboring light turning features are spaced apart from each other along the second axis within a threshold variance relative to being exactly aligned along the first axis with other neighboring light turning features in different rows, wherein the threshold variance is no more than about one-half of an average spacing between each of the plurality of other light turning features in different rows and corresponding neighboring light turning features along the second axis.

25. The apparatus of claim 20, wherein distances separating adjacent light turning means in the first column vary in a different progression than distances separating adjacent light turning means in the second column.

26. The apparatus of claim 20, wherein a density of light turning features in the array is varied between the first column and the second column and also varied within the rows, and wherein the first axis is substantially perpendicular to the second axis.

27. The apparatus of claim 20, wherein the array of light turning means corresponds to a majority of the area of a major surface of the light guide.

28. The apparatus of claim 20, further comprising a reflective display having a plurality of interferometric modulator display elements, wherein the light turning means are configured to redirect light toward the reflective display.

29. A computer-implemented method comprising:
   under control of one or more configured computer systems,
      obtaining an intensity profile corresponding to an initial placement of light turning features within an area of a light guide;
      determining, based on the intensity profile, a plurality of desired pitches between pairs of light turning features along a first axis, each desired pitch corresponding to a position within the area and along the first axis; and
      deriving, based on the desired pitches, an updated placement of light turning features within the area, wherein one or more pitches between adjacent light turning features of the initial placement along the first axis are adjusted in the updated placement.

30. The computer-implemented method of claim 29, wherein pitches between pairs of adjacent light turning features along a second axis in the updated placement have substantially the same progression along the second axis, and wherein the second axis is substantially orthogonal to the first axis.

31. The computer-implemented method of claim 30, wherein the pitches along the second axis in the updated placement are substantially the same as pitches between each pair of adjacent light turning features along the second axis in the initial placement.

32. The computer-implemented method of claim 30, further comprising varying the placement of one or more light turning features in the updated placement by adjusting the placement of the one or more light turning features within a variance that is no greater than a threshold variance of about one-half of an average spacing between neighboring light turning features along the second axis.

33. The computer-implemented method of claim 29, wherein the area includes a different number of light turning features along the first axis in the updated placement than in the initial placement.

34. The computer-implemented method of claim 29, wherein the area includes a region having a plurality of light turning features in the initial placement, and wherein the deriving includes computing an adjusted length of the region along the first axis in the updated placement and maintaining an equal number of light turning features within the region in the updated placement as in the initial placement, so as to adjust a pitch between light turning features in the updated placement.

35. The computer-implemented method of claim 34, wherein the region is rectangular.

36. The computer-implemented method of claim 29, wherein the deriving includes: increasing pitch between adjacent light turning features along the first axis for a position within the area corresponding to a light intensity hot spot in the initial placement, and decreasing pitch between adjacent light turning features along the first axis for a position within the area corresponding to a light intensity cold spot in the initial placement.

37. The computer-implemented method of claim 29, wherein each of the light turning features has substantially the same size.

38. The computer-implemented method of claim 29, wherein, in the updated placement, light turning features in a first column are spaced differently along the first axis than light turning features in a second column substantially parallel to the first column.

39. The computer-implemented method of claim 29, wherein, in the updated placement, a density of light turning features in the array is varied between a first rectangular column of the array and a second rectangular column of the array, and wherein the first rectangular column is substantially parallel to the second rectangular column.

40. The computer-implemented method of claim 39, wherein the first rectangular column and the second rectangular column have the same number of light turning features spaced along a second axis in both the initial placement and the updated placement, and wherein the second axis is substantially perpendicular to the first axis.

41. The apparatus of claim 1, wherein the spacing between adjacent light turning features from one end of the first column to an opposite end of the first column both increases and decreases relative to the spacing between adjacent light turning features from one end of the second column to the opposite end of the second column at corresponding points along the first axis.

42. The apparatus of claim 1, wherein light turning features along the first axis in a third column are spaced differently than both the light turning features along the first axis in the first column and the light turning features along the first axis in the second column.

43. The apparatus of claim 42, wherein each of the first, second, and third columns has a positive integer multiple of N light turning features aligned along the first axis, where N is an integer having a value of at least 2, and wherein at least two of the first, second, and third columns have different numbers of light turning features aligned along the first axis, the different numbers being a positive integer multiple of N different from each other.

* * * * *